(12) United States Patent
Alves et al.

(10) Patent No.: US 9,390,135 B2
(45) Date of Patent: Jul. 12, 2016

(54) EXECUTING CONTINUOUS EVENT PROCESSING (CEP) QUERIES IN PARALLEL

(71) Applicant: Oracle International Corporation, Redwood Shores, CA (US)

(72) Inventors: Alexandre de Castro Alves, Doral, FL (US); Anand Srinivasan, Bangalore (IN)

(73) Assignee: Oracle International Corporation, Redwood Shores, CA (US)

(*) Notice: Subject to any disclaimer, the term of this patent is extended or adjusted under 35 U.S.C. 154(b) by 102 days.

(21) Appl. No.: 13/770,961

(22) Filed: Feb. 19, 2013

(65) Prior Publication Data

US 2014/0236983 A1     Aug. 21, 2014

(51) Int. Cl.
*G06F 7/00* (2006.01)
*G06F 17/30* (2006.01)

(52) U.S. Cl.
CPC .... *G06F 17/30516* (2013.01); *G06F 17/30445* (2013.01); *G06F 17/30548* (2013.01)

(58) Field of Classification Search
None
See application file for complete search history.

(56) References Cited

U.S. PATENT DOCUMENTS

| | | | |
|---|---|---|---|
| 4,996,687 A | 2/1991 | Hess et al. | |
| 5,051,947 A | 9/1991 | Messenger et al. | |
| 5,339,392 A | 8/1994 | Risberg et al. | |
| 5,495,600 A | 2/1996 | Terry et al. | |
| 5,706,494 A | 1/1998 | Cochrane et al. | |
| 5,802,262 A | 9/1998 | Van De Vanter | |
| 5,802,523 A | 9/1998 | Jasuja et al. | |
| 5,822,750 A | 10/1998 | Jou et al. | |
| 5,826,077 A | 10/1998 | Blakeley et al. | |
| 5,850,544 A | 12/1998 | Parvathaneny et al. | |
| 5,857,182 A | 1/1999 | DeMichiel et al. | |

(Continued)

FOREIGN PATENT DOCUMENTS

| | | |
|---|---|---|
| CN | 104885077 | 9/2015 |
| CN | 104937591 | 9/2015 |

(Continued)

OTHER PUBLICATIONS

Oracle. "Oracle Complex Event Processing Exalogic Performance Study". Sep. 2011. http://www.oracle.com/technetwork/middleware/complex-event-processing/overview/cepexalogicwhitepaperfinal-498043.pdf. pp. 1-16.*

(Continued)

*Primary Examiner* — Robert Beausoliel, Jr.
*Assistant Examiner* — Michael Pham
(74) *Attorney, Agent, or Firm* — Kilpatrick Townsend and Stockton LLP

(57) ABSTRACT

A continuous event processing (CEP) query processor determines how and when a CEP query can be processed in a concurrent manner, such that multiple threads of execution can concurrently perform at least some of the CEP query's operations concurrently with each other. According to one technique, a user can instruct a CEP query processor to attempt to execute a CEP query in a concurrent manner. The CEP query processor responsively determines whether the CEP query's execution, or parts thereof, can be made concurrent based on certain constraints that can depend on inheritance and operation type. Based on this determination, the CEP query processor can execute at least certain parts of a CEP query in parallel relative to the same event within an event stream.

20 Claims, 6 Drawing Sheets

(56) References Cited

U.S. PATENT DOCUMENTS

| | | |
|---|---|---|
| 5,918,225 A | 6/1999 | White et al. |
| 5,920,716 A | 7/1999 | Johnson et al. |
| 5,937,195 A | 8/1999 | Ju et al. |
| 5,937,401 A | 8/1999 | Hillegas |
| 6,006,235 A | 12/1999 | Macdonald et al. |
| 6,011,916 A | 1/2000 | Moore et al. |
| 6,041,344 A | 3/2000 | Bodamer et al. |
| 6,081,801 A | 6/2000 | Cochrane et al. |
| 6,092,065 A | 7/2000 | Floratos et al. |
| 6,108,666 A | 8/2000 | Floratos et al. |
| 6,112,198 A | 8/2000 | Lohman et al. |
| 6,128,610 A | 10/2000 | Srinivasan et al. |
| 6,158,045 A | 12/2000 | You |
| 6,212,673 B1 | 4/2001 | House et al. |
| 6,219,660 B1 | 4/2001 | Haderle et al. |
| 6,263,332 B1 | 7/2001 | Nasr et al. |
| 6,278,994 B1 | 8/2001 | Fuh et al. |
| 6,282,537 B1 | 8/2001 | Madnick et al. |
| 6,341,281 B1 | 1/2002 | MacNicol et al. |
| 6,353,821 B1 | 3/2002 | Gray |
| 6,367,034 B1 | 4/2002 | Novik et al. |
| 6,370,537 B1 | 4/2002 | Gilbert et al. |
| 6,389,436 B1 | 5/2002 | Chakrabarti et al. |
| 6,397,262 B1 | 5/2002 | Hayden et al. |
| 6,418,448 B1 | 7/2002 | Sarkar |
| 6,438,540 B2 | 8/2002 | Nasr et al. |
| 6,438,559 B1 | 8/2002 | White et al. |
| 6,439,783 B1 | 8/2002 | Antoshenkov |
| 6,449,620 B1 | 9/2002 | Draper et al. |
| 6,453,314 B1 | 9/2002 | Chan et al. |
| 6,507,834 B1 | 1/2003 | Kabra et al. |
| 6,523,102 B1 | 2/2003 | Dye et al. |
| 6,546,381 B1 | 4/2003 | Subramanian et al. |
| 6,615,203 B1 | 9/2003 | Lin et al. |
| 6,681,343 B1 | 1/2004 | Nakabo |
| 6,708,186 B1 | 3/2004 | Claborn et al. |
| 6,718,278 B1 | 4/2004 | Steggles |
| 6,748,386 B1 | 6/2004 | Li |
| 6,751,619 B1 | 6/2004 | Rowstron et al. |
| 6,766,330 B1 | 7/2004 | Chen et al. |
| 6,785,677 B1 | 8/2004 | Fritchman |
| 6,826,566 B2 | 11/2004 | Lewak et al. |
| 6,836,778 B2 | 12/2004 | Manikutty et al. |
| 6,850,925 B2 | 2/2005 | Chaudhuri et al. |
| 6,856,981 B2 | 2/2005 | Wyschogrod et al. |
| 6,985,904 B1 | 1/2006 | Kaluskar et al. |
| 6,996,557 B1 | 2/2006 | Leung et al. |
| 7,020,696 B1 | 3/2006 | Perry et al. |
| 7,047,249 B1 | 5/2006 | Vincent |
| 7,051,034 B1 | 5/2006 | Ghosh et al. |
| 7,062,749 B2 | 6/2006 | Cyr et al. |
| 7,080,062 B1 | 7/2006 | Leung et al. |
| 7,093,023 B2 | 8/2006 | Lockwood et al. |
| 7,145,938 B2 | 12/2006 | Takeuchi et al. |
| 7,146,352 B2 | 12/2006 | Brundage et al. |
| 7,167,848 B2 | 1/2007 | Boukouvalas et al. |
| 7,203,927 B2 | 4/2007 | Al-Azzawe et al. |
| 7,224,185 B2 | 5/2007 | Campbell et al. |
| 7,225,188 B1 | 5/2007 | Gai et al. |
| 7,236,972 B2 | 6/2007 | Lewak et al. |
| 7,305,391 B2 | 12/2007 | Wyschogrod et al. |
| 7,308,561 B2 | 12/2007 | Cornet et al. |
| 7,310,638 B1 | 12/2007 | Blair |
| 7,376,656 B2 | 5/2008 | Blakeley et al. |
| 7,383,253 B1 | 6/2008 | Tsimelzon et al. |
| 7,403,959 B2 | 7/2008 | Nishizawa et al. |
| 7,430,549 B2 | 9/2008 | Zane et al. |
| 7,451,143 B2 | 11/2008 | Sharangpani et al. |
| 7,475,058 B2 | 1/2009 | Kakivaya et al. |
| 7,483,976 B2 | 1/2009 | Ross |
| 7,516,121 B2 | 4/2009 | Liu et al. |
| 7,519,577 B2 | 4/2009 | Brundage et al. |
| 7,519,962 B2 | 4/2009 | Aman |
| 7,533,087 B2 | 5/2009 | Liu et al. |
| 7,546,284 B1 | 6/2009 | Martinez et al. |
| 7,552,365 B1 | 6/2009 | March et al. |
| 7,567,953 B2 | 7/2009 | Kadayam et al. |
| 7,580,946 B2 | 8/2009 | Mansour et al. |
| 7,587,383 B2 | 9/2009 | Koo et al. |
| 7,603,674 B2 | 10/2009 | Cyr et al. |
| 7,613,848 B2 | 11/2009 | Amini et al. |
| 7,620,851 B1 | 11/2009 | Leavy et al. |
| 7,630,982 B2 | 12/2009 | Boyce |
| 7,634,501 B2 | 12/2009 | Yabloko |
| 7,636,703 B2 | 12/2009 | Taylor |
| 7,644,066 B2 | 1/2010 | Krishnaprasad et al. |
| 7,653,645 B1 | 1/2010 | Stokes |
| 7,672,964 B1 | 3/2010 | Yan et al. |
| 7,673,065 B2 | 3/2010 | Srinivasan et al. |
| 7,676,461 B2 | 3/2010 | Chikodrov et al. |
| 7,689,622 B2 | 3/2010 | Liu et al. |
| 7,693,891 B2 | 4/2010 | Stokes et al. |
| 7,702,629 B2 | 4/2010 | Cytron et al. |
| 7,702,639 B2 | 4/2010 | Stanley et al. |
| 7,711,782 B2 | 5/2010 | Kim et al. |
| 7,716,210 B2 | 5/2010 | Ozcan et al. |
| 7,739,265 B2 | 6/2010 | Jain et al. |
| 7,805,445 B2 | 9/2010 | Boyer et al. |
| 7,814,111 B2 | 10/2010 | Levin |
| 7,818,313 B1 | 10/2010 | Tsimelzon |
| 7,823,066 B1 | 10/2010 | Kuramura |
| 7,827,146 B1 | 11/2010 | De Landstheer et al. |
| 7,827,190 B2 | 11/2010 | Pandya |
| 7,844,829 B2 | 11/2010 | Meenakshisundaram |
| 7,870,124 B2 | 1/2011 | Liu et al. |
| 7,870,167 B2 | 1/2011 | Lu et al. |
| 7,877,381 B2 | 1/2011 | Ewen et al. |
| 7,895,187 B2 | 2/2011 | Bowman |
| 7,912,853 B2 | 3/2011 | Agrawal |
| 7,917,299 B2 | 3/2011 | Buhler et al. |
| 7,930,322 B2 | 4/2011 | MacLennan |
| 7,945,540 B2 | 5/2011 | Park et al. |
| 7,953,728 B2 | 5/2011 | Hu et al. |
| 7,954,109 B1 | 5/2011 | Durham et al. |
| 7,979,420 B2 | 7/2011 | Jain et al. |
| 7,987,204 B2 | 7/2011 | Stokes |
| 7,988,817 B2 | 8/2011 | Son |
| 7,991,766 B2 | 8/2011 | Srinivasan et al. |
| 7,996,388 B2 | 8/2011 | Jain et al. |
| 8,019,747 B2 | 9/2011 | Srinivasan et al. |
| 8,032,544 B2 | 10/2011 | Jing et al. |
| 8,046,747 B2 | 10/2011 | Cyr et al. |
| 8,073,826 B2 | 12/2011 | Srinivasan et al. |
| 8,099,400 B2 | 1/2012 | Haub et al. |
| 8,103,655 B2 | 1/2012 | Srinivasan et al. |
| 8,134,184 B2 | 3/2012 | Becker et al. |
| 8,145,686 B2 | 3/2012 | Raman et al. |
| 8,155,880 B2 | 4/2012 | Patel et al. |
| 8,195,648 B2 | 6/2012 | Zabback et al. |
| 8,204,873 B2 | 6/2012 | Chavan |
| 8,204,875 B2 | 6/2012 | Srinivasan et al. |
| 8,260,803 B2 | 9/2012 | Hsu et al. |
| 8,290,776 B2 | 10/2012 | Moriwaki et al. |
| 8,296,316 B2 | 10/2012 | Jain et al. |
| 8,307,343 B2 | 11/2012 | Chaudhuri et al. |
| 8,315,990 B2 | 11/2012 | Barga et al. |
| 8,316,012 B2 | 11/2012 | Abouzied et al. |
| 8,346,511 B2 | 1/2013 | Schoning et al. |
| 8,370,812 B2 | 2/2013 | Feblowitz et al. |
| 8,392,402 B2 | 3/2013 | Mihaila et al. |
| 8,396,886 B1 | 3/2013 | Tsimelzon |
| 8,447,744 B2 | 5/2013 | De Castro Alves et al. |
| 8,458,175 B2 | 6/2013 | Stokes |
| 8,498,956 B2 | 7/2013 | Srinivasan et al. |
| 8,521,867 B2 | 8/2013 | Srinivasan et al. |
| 8,527,458 B2 | 9/2013 | Park et al. |
| 8,543,558 B2 | 9/2013 | Srinivasan et al. |
| 8,572,589 B2 | 10/2013 | Cataldo et al. |
| 8,589,436 B2 | 11/2013 | Srinivasan et al. |
| 8,676,841 B2 | 3/2014 | Srinivasan et al. |
| 8,713,049 B2 | 4/2014 | Jain et al. |
| 8,719,207 B2 | 5/2014 | Ratnam et al. |
| 8,745,070 B2 | 6/2014 | Krishnamurthy |
| 8,762,369 B2 | 6/2014 | Macho et al. |

(56) References Cited

U.S. PATENT DOCUMENTS

| | | |
|---|---|---|
| 8,775,412 B2 | 7/2014 | Day et al. |
| 9,047,249 B2 | 6/2015 | de Castro Alves et al. |
| 9,189,280 B2 | 11/2015 | Park et al. |
| 9,244,978 B2 | 1/2016 | Alves et al. |
| 9,256,646 B2 | 2/2016 | Deshmukh et al. |
| 9,262,258 B2 | 2/2016 | Alves et al. |
| 9,262,479 B2 | 2/2016 | Deshmukh et al. |
| 2002/0023211 A1 | 2/2002 | Roth et al. |
| 2002/0032804 A1 | 3/2002 | Hunt |
| 2002/0038313 A1 | 3/2002 | Klein et al. |
| 2002/0049788 A1 | 4/2002 | Lipkin et al. |
| 2002/0056004 A1 | 5/2002 | Smith et al. |
| 2002/0073399 A1 | 6/2002 | Golden |
| 2002/0116362 A1 | 8/2002 | Li et al. |
| 2002/0116371 A1 | 8/2002 | Dodds et al. |
| 2002/0133484 A1 | 9/2002 | Chau et al. |
| 2002/0169788 A1 | 11/2002 | Lee et al. |
| 2003/0014408 A1 | 1/2003 | Robertson |
| 2003/0037048 A1 | 2/2003 | Kabra et al. |
| 2003/0046673 A1 | 3/2003 | Copeland et al. |
| 2003/0065655 A1 | 4/2003 | Syeda-Mahmood |
| 2003/0065659 A1 | 4/2003 | Agarwal et al. |
| 2003/0120682 A1 | 6/2003 | Bestgen et al. |
| 2003/0135304 A1 | 7/2003 | Sroub et al. |
| 2003/0200198 A1 | 10/2003 | Chandrasekar et al. |
| 2003/0229652 A1 | 12/2003 | Bakalash et al. |
| 2003/0236766 A1 | 12/2003 | Fortuna et al. |
| 2004/0010496 A1 | 1/2004 | Behrendt et al. |
| 2004/0019592 A1 | 1/2004 | Crabtree |
| 2004/0024773 A1 | 2/2004 | Stoffel et al. |
| 2004/0064466 A1 | 4/2004 | Manikutty et al. |
| 2004/0073534 A1 | 4/2004 | Robson |
| 2004/0088404 A1 | 5/2004 | Aggarwal |
| 2004/0117359 A1 | 6/2004 | Snodgrass et al. |
| 2004/0136598 A1 | 7/2004 | Le Leannec et al. |
| 2004/0151382 A1 | 8/2004 | Stellenberg et al. |
| 2004/0153329 A1 | 8/2004 | Casati et al. |
| 2004/0167864 A1 | 8/2004 | Wang et al. |
| 2004/0168107 A1 | 8/2004 | Sharp |
| 2004/0177053 A1 | 9/2004 | Donoho et al. |
| 2004/0201612 A1 | 10/2004 | Hild et al. |
| 2004/0205082 A1 | 10/2004 | Fontoura et al. |
| 2004/0220896 A1 | 11/2004 | Finlay et al. |
| 2004/0220912 A1 | 11/2004 | Manikutty et al. |
| 2004/0220927 A1 | 11/2004 | Murthy et al. |
| 2004/0243590 A1 | 12/2004 | Gu et al. |
| 2004/0267760 A1 | 12/2004 | Brundage et al. |
| 2004/0268314 A1 | 12/2004 | Kollman et al. |
| 2005/0010896 A1 | 1/2005 | Meliksetian et al. |
| 2005/0055338 A1 | 3/2005 | Warner et al. |
| 2005/0065949 A1 | 3/2005 | Warner et al. |
| 2005/0096124 A1 | 5/2005 | Stronach |
| 2005/0097128 A1 | 5/2005 | Ryan et al. |
| 2005/0120016 A1 | 6/2005 | Midgley |
| 2005/0154740 A1 | 7/2005 | Day |
| 2005/0174940 A1 | 8/2005 | Iny |
| 2005/0177579 A1 | 8/2005 | Blakeley et al. |
| 2005/0192921 A1 | 9/2005 | Chaudhuri et al. |
| 2005/0204340 A1 | 9/2005 | Ruminer et al. |
| 2005/0229158 A1 | 10/2005 | Thusoo et al. |
| 2005/0273352 A1 | 12/2005 | Moffat et al. |
| 2005/0273450 A1 | 12/2005 | McMillen et al. |
| 2005/0289125 A1 | 12/2005 | Liu et al. |
| 2006/0007308 A1 | 1/2006 | Ide et al. |
| 2006/0015482 A1 | 1/2006 | Beyer et al. |
| 2006/0031204 A1 | 2/2006 | Liu et al. |
| 2006/0047696 A1 | 3/2006 | Larson et al. |
| 2006/0064487 A1 | 3/2006 | Ross |
| 2006/0080646 A1 | 4/2006 | Aman |
| 2006/0085592 A1 | 4/2006 | Ganguly et al. |
| 2006/0089939 A1 | 4/2006 | Broda et al. |
| 2006/0100957 A1 | 5/2006 | Buttler et al. |
| 2006/0100969 A1 | 5/2006 | Wang et al. |
| 2006/0106786 A1 | 5/2006 | Day et al. |
| 2006/0106797 A1 | 5/2006 | Srinivasa et al. |
| 2006/0129554 A1 | 6/2006 | Suyama et al. |
| 2006/0155719 A1 | 7/2006 | Mihaeli et al. |
| 2006/0167704 A1 | 7/2006 | Nicholls et al. |
| 2006/0167856 A1 | 7/2006 | Angele et al. |
| 2006/0212441 A1 | 9/2006 | Tang et al. |
| 2006/0224576 A1 | 10/2006 | Liu et al. |
| 2006/0230029 A1* | 10/2006 | Yan .................................. 707/3 |
| 2006/0235840 A1 | 10/2006 | Manikutty et al. |
| 2006/0242180 A1 | 10/2006 | Graf et al. |
| 2006/0282429 A1 | 12/2006 | Hernandez-Sherrington et al. |
| 2006/0294095 A1 | 12/2006 | Berk et al. |
| 2007/0016467 A1 | 1/2007 | John et al. |
| 2007/0022092 A1 | 1/2007 | Nishizawa et al. |
| 2007/0039049 A1 | 2/2007 | Kupferman et al. |
| 2007/0050340 A1 | 3/2007 | von Kaenel et al. |
| 2007/0076314 A1 | 4/2007 | Rigney |
| 2007/0118600 A1 | 5/2007 | Arora |
| 2007/0136239 A1 | 6/2007 | Lee et al. |
| 2007/0136254 A1 | 6/2007 | Choi et al. |
| 2007/0156787 A1 | 7/2007 | MacGregor |
| 2007/0156964 A1 | 7/2007 | Sistla |
| 2007/0192301 A1 | 8/2007 | Posner |
| 2007/0198479 A1 | 8/2007 | Cai et al. |
| 2007/0214171 A1 | 9/2007 | Behnen |
| 2007/0226188 A1 | 9/2007 | Johnson et al. |
| 2007/0226239 A1 | 9/2007 | Johnson et al. |
| 2007/0271280 A1 | 11/2007 | Chandasekaran |
| 2007/0294217 A1 | 12/2007 | Chen et al. |
| 2008/0005093 A1 | 1/2008 | Liu et al. |
| 2008/0010093 A1 | 1/2008 | LaPlante et al. |
| 2008/0010241 A1 | 1/2008 | McGoveran |
| 2008/0016095 A1 | 1/2008 | Bhatnagar et al. |
| 2008/0028095 A1 | 1/2008 | Lang et al. |
| 2008/0033914 A1 | 2/2008 | Cherniack et al. |
| 2008/0034427 A1 | 2/2008 | Cadambi et al. |
| 2008/0046401 A1 | 2/2008 | Lee et al. |
| 2008/0071904 A1 | 3/2008 | Schuba et al. |
| 2008/0077570 A1 | 3/2008 | Tang et al. |
| 2008/0077587 A1 | 3/2008 | Wyschogrod et al. |
| 2008/0077780 A1 | 3/2008 | Zingher |
| 2008/0082484 A1 | 4/2008 | Averbuch et al. |
| 2008/0082514 A1 | 4/2008 | Khorlin et al. |
| 2008/0086321 A1 | 4/2008 | Walton |
| 2008/0098359 A1 | 4/2008 | Ivanov et al. |
| 2008/0110397 A1 | 5/2008 | Son |
| 2008/0114787 A1 | 5/2008 | Kashiyama et al. |
| 2008/0120283 A1 | 5/2008 | Liu et al. |
| 2008/0120321 A1 | 5/2008 | Liu et al. |
| 2008/0162583 A1 | 7/2008 | Brown et al. |
| 2008/0195577 A1 | 8/2008 | Fan et al. |
| 2008/0235298 A1 | 9/2008 | Lin et al. |
| 2008/0243451 A1 | 10/2008 | Feblowitz et al. |
| 2008/0243675 A1 | 10/2008 | Parsons et al. |
| 2008/0250073 A1 | 10/2008 | Nori et al. |
| 2008/0255847 A1 | 10/2008 | Moriwaki et al. |
| 2008/0263039 A1 | 10/2008 | Van Lunteren |
| 2008/0270764 A1 | 10/2008 | McMillen et al. |
| 2008/0281782 A1 | 11/2008 | Agrawal |
| 2008/0301086 A1 | 12/2008 | Gupta |
| 2008/0301124 A1 | 12/2008 | Alves et al. |
| 2008/0301125 A1 | 12/2008 | Alves et al. |
| 2008/0301135 A1 | 12/2008 | Alves et al. |
| 2008/0301256 A1 | 12/2008 | McWilliams et al. |
| 2008/0313131 A1 | 12/2008 | Friedman et al. |
| 2009/0006320 A1 | 1/2009 | Ding et al. |
| 2009/0006346 A1 | 1/2009 | C N et al. |
| 2009/0007098 A1 | 1/2009 | Chevrette et al. |
| 2009/0019045 A1 | 1/2009 | Amir et al. |
| 2009/0024622 A1 | 1/2009 | Chkodrov et al. |
| 2009/0043729 A1 | 2/2009 | Liu et al. |
| 2009/0070355 A1 | 3/2009 | Cadarette et al. |
| 2009/0070785 A1 | 3/2009 | Alvez et al. |
| 2009/0070786 A1 | 3/2009 | Alves et al. |
| 2009/0076899 A1 | 3/2009 | Gbodimowo |
| 2009/0088962 A1 | 4/2009 | Jones |
| 2009/0100029 A1 | 4/2009 | Jain et al. |
| 2009/0106189 A1 | 4/2009 | Jain et al. |
| 2009/0106190 A1 | 4/2009 | Srinivasan et al. |
| 2009/0106198 A1 | 4/2009 | Srinivasan et al. |

(56) References Cited

U.S. PATENT DOCUMENTS

| | | |
|---|---|---|
| 2009/0106214 A1 | 4/2009 | Jain et al. |
| 2009/0106215 A1 | 4/2009 | Jain et al. |
| 2009/0106218 A1 | 4/2009 | Srinivasan et al. |
| 2009/0106321 A1 | 4/2009 | Das et al. |
| 2009/0106440 A1 | 4/2009 | Srinivasan et al. |
| 2009/0112802 A1 | 4/2009 | Srinivasan et al. |
| 2009/0112803 A1 | 4/2009 | Srinivasan et al. |
| 2009/0112853 A1 | 4/2009 | Nishizawa et al. |
| 2009/0125550 A1 | 5/2009 | Barga et al. |
| 2009/0125916 A1 | 5/2009 | Lu et al. |
| 2009/0132503 A1 | 5/2009 | Sun |
| 2009/0133041 A1 | 5/2009 | Rahman et al. |
| 2009/0144696 A1 | 6/2009 | Andersen |
| 2009/0172014 A1 | 7/2009 | Huetter |
| 2009/0182779 A1 | 7/2009 | Johnson |
| 2009/0187584 A1 | 7/2009 | Johnson et al. |
| 2009/0192981 A1 | 7/2009 | Papaemmanouil et al. |
| 2009/0216747 A1 | 8/2009 | Li et al. |
| 2009/0216860 A1 | 8/2009 | Li et al. |
| 2009/0222730 A1 | 9/2009 | Wixson et al. |
| 2009/0228431 A1 | 9/2009 | Dunagan et al. |
| 2009/0228434 A1 | 9/2009 | Krishnamurthy et al. |
| 2009/0245236 A1 | 10/2009 | Scott et al. |
| 2009/0248749 A1 | 10/2009 | Gu et al. |
| 2009/0254522 A1 | 10/2009 | Chaudhuri et al. |
| 2009/0257314 A1 | 10/2009 | Davis et al. |
| 2009/0265324 A1 | 10/2009 | Mordvinov |
| 2009/0271529 A1 | 10/2009 | Kashiyama et al. |
| 2009/0282021 A1 | 11/2009 | Bennett et al. |
| 2009/0293046 A1 | 11/2009 | Cheriton |
| 2009/0300093 A1 | 12/2009 | Griffiths et al. |
| 2009/0300181 A1 | 12/2009 | Marques |
| 2009/0300580 A1 | 12/2009 | Heyhoe et al. |
| 2009/0300615 A1 | 12/2009 | Andrade et al. |
| 2009/0313198 A1 | 12/2009 | Kudo et al. |
| 2009/0319501 A1 | 12/2009 | Goldstein et al. |
| 2009/0327102 A1 | 12/2009 | Maniar et al. |
| 2009/0327257 A1 | 12/2009 | Abouzeid et al. |
| 2010/0017379 A1 | 1/2010 | Naibo et al. |
| 2010/0017380 A1 | 1/2010 | Naibo et al. |
| 2010/0023498 A1 | 1/2010 | Dettinger et al. |
| 2010/0036803 A1 | 2/2010 | Vemuri et al. |
| 2010/0036831 A1 | 2/2010 | Vemuri |
| 2010/0049710 A1 | 2/2010 | Young, Jr. et al. |
| 2010/0057663 A1 | 3/2010 | Srinivasan et al. |
| 2010/0057727 A1 | 3/2010 | Srinivasan et al. |
| 2010/0057735 A1 | 3/2010 | Srinivasan et al. |
| 2010/0057736 A1 | 3/2010 | Srinivasan et al. |
| 2010/0057737 A1 | 3/2010 | Srinivasan et al. |
| 2010/0094838 A1 | 4/2010 | Kozak |
| 2010/0106710 A1 | 4/2010 | Nishikawa |
| 2010/0106946 A1 | 4/2010 | Imaki et al. |
| 2010/0125574 A1 | 5/2010 | Navas |
| 2010/0125584 A1 | 5/2010 | Navas |
| 2010/0138405 A1 | 6/2010 | Mihaila |
| 2010/0161589 A1 | 6/2010 | Nica et al. |
| 2010/0223305 A1* | 9/2010 | Park et al. ............ 707/814 |
| 2010/0223437 A1 | 9/2010 | Park et al. |
| 2010/0223606 A1 | 9/2010 | Park et al. |
| 2010/0250572 A1 | 9/2010 | Chen |
| 2010/0293135 A1 | 11/2010 | Candea et al. |
| 2010/0312756 A1 | 12/2010 | Zhang et al. |
| 2010/0318652 A1 | 12/2010 | Samba |
| 2010/0332401 A1 | 12/2010 | Prahlad et al. |
| 2011/0004621 A1 | 1/2011 | Kelley et al. |
| 2011/0016160 A1 | 1/2011 | Zhang et al. |
| 2011/0022618 A1 | 1/2011 | Thatte et al. |
| 2011/0023055 A1 | 1/2011 | Thatte et al. |
| 2011/0029484 A1 | 2/2011 | Park et al. |
| 2011/0029485 A1 | 2/2011 | Park et al. |
| 2011/0040746 A1 | 2/2011 | Handa et al. |
| 2011/0055192 A1 | 3/2011 | Tang et al. |
| 2011/0055197 A1 | 3/2011 | Chavan |
| 2011/0093162 A1 | 4/2011 | Nielsen et al. |
| 2011/0093491 A1* | 4/2011 | Zabback et al. ......... 707/769 |
| 2011/0105857 A1 | 5/2011 | Zhang et al. |
| 2011/0161321 A1 | 6/2011 | de Castro Alves et al. |
| 2011/0161328 A1 | 6/2011 | Park et al. |
| 2011/0161352 A1 | 6/2011 | de Castro Alves et al. |
| 2011/0161356 A1 | 6/2011 | de Castro Alves et al. |
| 2011/0161397 A1 | 6/2011 | Bekiares et al. |
| 2011/0173231 A1 | 7/2011 | Drissi et al. |
| 2011/0173235 A1 | 7/2011 | Aman et al. |
| 2011/0196839 A1 | 8/2011 | Smith et al. |
| 2011/0196891 A1 | 8/2011 | de Castro Alves et al. |
| 2011/0246445 A1 | 10/2011 | Mishra |
| 2011/0270879 A1 | 11/2011 | Srinivasan et al. |
| 2011/0282812 A1 | 11/2011 | Chandramouli et al. |
| 2011/0302164 A1 | 12/2011 | Krishnamurthy et al. |
| 2011/0313844 A1 | 12/2011 | Chandramouli et al. |
| 2011/0314019 A1 | 12/2011 | Jimenez Peris et al. |
| 2011/0321057 A1 | 12/2011 | Mejdrich et al. |
| 2012/0016866 A1 | 1/2012 | Dunagan |
| 2012/0041934 A1 | 2/2012 | Srinivasan et al. |
| 2012/0072455 A1 | 3/2012 | Jain et al. |
| 2012/0130963 A1 | 5/2012 | Luo et al. |
| 2012/0131139 A1 | 5/2012 | Siripurapu et al. |
| 2012/0166417 A1* | 6/2012 | Chandramouli .. G06F 17/30516 707/713 |
| 2012/0166421 A1 | 6/2012 | Cammert et al. |
| 2012/0166469 A1* | 6/2012 | Cammert .......... G06F 17/30516 707/769 |
| 2012/0191697 A1 | 7/2012 | Sherman et al. |
| 2012/0233107 A1* | 9/2012 | Roesch et al. ................ 706/47 |
| 2012/0259910 A1 | 10/2012 | Andrade et al. |
| 2012/0278473 A1 | 11/2012 | Griffiths |
| 2012/0284420 A1 | 11/2012 | Shukla et al. |
| 2012/0290715 A1 | 11/2012 | Dinger et al. |
| 2012/0291049 A1 | 11/2012 | Park et al. |
| 2012/0324453 A1 | 12/2012 | Chandramouli et al. |
| 2013/0014088 A1 | 1/2013 | Park et al. |
| 2013/0031567 A1 | 1/2013 | Nano et al. |
| 2013/0046725 A1 | 2/2013 | Cammert et al. |
| 2013/0117317 A1 | 5/2013 | Wolf |
| 2013/0144866 A1 | 6/2013 | Jerzak et al. |
| 2013/0191370 A1 | 7/2013 | Chen et al. |
| 2013/0262399 A1 | 10/2013 | Eker et al. |
| 2013/0332240 A1* | 12/2013 | Patri et al. ................ 705/7.36 |
| 2014/0095444 A1 | 4/2014 | Deshmukh et al. |
| 2014/0095445 A1 | 4/2014 | Deshmukh et al. |
| 2014/0095446 A1 | 4/2014 | Deshmukh et al. |
| 2014/0095447 A1 | 4/2014 | Deshmukh et al. |
| 2014/0095462 A1 | 4/2014 | Park et al. |
| 2014/0095471 A1 | 4/2014 | Deshmukh et al. |
| 2014/0095473 A1 | 4/2014 | Srinivasan et al. |
| 2014/0095483 A1 | 4/2014 | Toillion et al. |
| 2014/0095525 A1 | 4/2014 | Hsiao et al. |
| 2014/0095529 A1 | 4/2014 | Deshmukh et al. |
| 2014/0095533 A1 | 4/2014 | Shukla et al. |
| 2014/0095535 A1 | 4/2014 | Deshmukh et al. |
| 2014/0095537 A1 | 4/2014 | Park et al. |
| 2014/0095540 A1 | 4/2014 | Hsiao et al. |
| 2014/0095541 A1 | 4/2014 | Herwadkar et al. |
| 2014/0095543 A1 | 4/2014 | Hsiao et al. |
| 2014/0136514 A1 | 5/2014 | Jain et al. |
| 2014/0156683 A1 | 6/2014 | de Castro Alves |
| 2014/0172506 A1 | 6/2014 | Parsell et al. |
| 2014/0172914 A1 | 6/2014 | Elnikety et al. |
| 2014/0201225 A1 | 7/2014 | Deshmukh et al. |
| 2014/0201355 A1 | 7/2014 | Bishnoi et al. |
| 2014/0237289 A1 | 8/2014 | de Castro Alves et al. |
| 2014/0358959 A1 | 12/2014 | Bishnoi et al. |
| 2014/0379712 A1 | 12/2014 | Lafuente Alvarez |
| 2015/0156241 A1 | 6/2015 | Shukla et al. |
| 2015/0161214 A1 | 6/2015 | Kali et al. |
| 2015/0363464 A1 | 12/2015 | Alves et al. |
| 2015/0381712 A1 | 12/2015 | De Castro Alves et al. |
| 2016/0034311 A1 | 2/2016 | Park et al. |

FOREIGN PATENT DOCUMENTS

| | | |
|---|---|---|
| EP | 1241589 A2 | 9/2002 |
| EP | 2474922 | 7/2012 |
| EP | 2946314 | 11/2015 |

(56) References Cited

FOREIGN PATENT DOCUMENTS

| | | |
|---|---|---|
| EP | 2946527 | 11/2015 |
| EP | 2959408 | 12/2015 |
| JP | 2002-251233 A | 9/2002 |
| JP | 2007-328716 A | 12/2007 |
| JP | 2008-541225 A | 11/2008 |
| JP | 2009-134689 A | 6/2009 |
| JP | 2010-108073 A | 5/2010 |
| JP | 2011-039818 A | 2/2011 |
| JP | 2015536001 | 12/2015 |
| JP | 2016500167 | 1/2016 |
| WO | 00/49533 A2 | 8/2000 |
| WO | WO0049533 | 8/2000 |
| WO | 0118712 | 3/2001 |
| WO | 01/59602 A2 | 8/2001 |
| WO | 01/65418 A2 | 9/2001 |
| WO | 03/030031 A2 | 4/2003 |
| WO | 2007122347 | 11/2007 |
| WO | WO2009/119811 A1 | 10/2009 |
| WO | 2012050582 | 4/2012 |
| WO | 2015191120 | 12/2015 |

OTHER PUBLICATIONS

Call User Defined Functions from Pig, Amazon Elastic MapReduce, Mar. 2009, 2 pages.
Strings in C, retrieved from the internet: <URL: https://web.archive.org/web/20070612231205/http:l/web.cs.swarthmore.edu/-newhall/unixhelp/C_strings.html> [retrieved on May 13, 2014], Swarthmore College, Jun. 12, 2007, 3 pages.
Non-Final Office Action for U.S. Appl. No. 12/913,636 dated Jul. 24, 2014, 21 pages.
U.S. Appl. No. 11/874,197, Notice of Allowance mailed on Jun. 22, 2012, 20 pages.
U.S. Appl. No. 12/396,464, Final Office Action mailed on May 16, 2014, 16 pages.
U.S. Appl. No. 12/548,187, Final Office Action mailed on Jun. 4, 2014, 64 pages.
U.S. Appl. No. 13/089,556, Final Office Action mailed on Jun. 13, 2014, 14 pages.
U.S. Appl. No. 13/107,742, Non-Final Office Action mailed on Jun. 19, 2014, 20 pages.
U.S. Appl. No. 13/244,272, Notice of Allowance mailed on Aug. 12, 2013, 12 pages.
International Application No. PCT/US2011/052019, International Preliminary Report on Patentability mailed on Mar. 28, 2013, 6 pages.
International Application No. PCT/US2012/034970, International Preliminary Report on Patentability mailed on Nov. 21, 2013, 7 pages.
International Application No. PCT/US2012/036353, International Preliminary Report on Patentability mailed on Nov. 28, 2013, 6 pages.
Oracle™ Fusion Middleware CQL Language Reference, 11g Release 1 (11.1.1.6.3) E12048-10, Aug. 2012, pp. 6-1 to 6-12.
Oracle™ Complex Event Processing CQL Language Reference, 11g Release 1 (11.1.1.4.0) E12048-04, Jan. 2011, pp. 6.1 to 6.12.
Oracle™ Complex Event Processing CQL Language Reference, 11g Release 1 (11.1.1) E12048-03, Apr. 2010, sections 18-4 to 18.4.2.
Pattern Recognition With Match_Recognize, Oracle™ Complex Event Processing CQL Language Reference, 11g Release 1 (11.1.1) E12048-01, May 2009, pp. 15.1 to 15.20.
SQL Tutorial-In, Tizag.com, http://web.archive.org/web/20090216215219/http://www.tizag.com/sqiTutorial/sqlin.php,, Feb. 16, 2009, pp. 1-3.
Supply Chain Event Management: Real-Time Supply Chain Event Management, product information Manhattan Associates, 2009-2012.
U.S. Appl. No. 11/601,415, Non-Final Office Action issued in Non-KTS matter U.S. Appl. No. 11/601,415 mailed on Dec. 11, 2013, 58 pages.
U.S. Appl. No. 11/977,437, Notice of Allowance mailed on Jul. 10, 2013, 10 pages.
U.S. Appl. No. 12/396,464, Non Final Office Action mailed on Dec. 31, 2013, 16 pages.
U.S. Appl. No. 12/548,187, Final Office Action mailed on Jun. 10, 2013, 18 pages.
U.S. Appl. No. 12/548,222, Notice of Allowance mailed on Jul. 18, 2013, 12 pages.
U.S. Appl. No. 12/548,281, Final Office Action Oct. 10, 2013, 21 pages.
U.S. Appl. No. 12/548,290, Notice of Allowance mailed on Sep. 11, 2013, 6 pages.
U.S. Appl. No. 12/949,081, Final Office Action mailed mailed on Aug. 27, 2013, 13 pages.
U.S. Appl. No. 13/089,556, Final Office Action mailed on Aug. 29, 2013, 10 pages.
U.S. Appl. No. 13/089,556, Non-Final Office Action mailed on Jan. 9, 2014, 14 Pages.
U.S. Appl. No. 13/102,665, Final Office Action mailed on Jul. 9, 2013, 17 pages.
U.S. Appl. No. 13/107,742, Final Office Action mailed on Jul. 3, 2013, 19 pages.
U.S. Appl. No. 13/177,748, Non-Final Office Action mailed on Aug. 30, 2013, 24 pages.
U.S. Appl. No. 13/193,377, Notice of Allowance mailed on Aug. 30, 2013, 19 pages.
U.S. Appl. No. 12/548,187, Non-Final Office Action for mailed on Feb. 6, 2014, 53 pages.
Agrawal et al. "Efficient pattern matching over event streams," Proceedings of the 2008 ACM SIGMOD international conference on Management of data, pp. 147-160 (Jun. 2008).
Chandramouli et al., High-Performance Dynamic Pattern Matching over Disordered Streams, Proceedings of the VLDB Endowment, vol. 3, Issue 1-2, Sep. 2010, pp. 220-231.
Chapple "Combining Query Results with the UNION Command," ask.com Computing Databases, downloaded from: http://databases.about.com/od/sql/a/union.htm (no date, printed on Oct. 14, 2013).
Fantozzi, A Strategic Approach to Supply Chain Event Management, student submission for Masters Degree, Massachusetts Institute of Technology, Jun. 2003.
Komazec et al., Towards Efficient Schema-Enhanced Pattern Matching over RDF Data Streams, Proceedings of the 1st International Workshop on Ordering and Reasoning (OrdRing 2011), Bonn, Germany, Oct. 2011.
Ogrodnek, Custom UDFs and hive, Bizo development blog http://dev.bizo.com, Jun. 23, 2009, 2 pages.
Pradhan, Implementing and Configuring SAP® Event Management, Galileo Press, 2010, pp. 17-21.
Wilson et al., SAP Event Management, an Overview, Q Data USA, Inc., 2009.
Notice of Allowance for U.S. Appl. No. 11/977,437 dated Mar. 4, 2013. 9 pages.
Final Office Action for U.S. Appl. No. 13/244,272 dated Mar. 28, 2013, 29 pages.
Notice of Allowance for U.S. Appl. No. 12/957,194 dated Mar. 20, 2013. 9 pages.
Kawaguchi et al. "Java Architecture for XML Binding (JAXB) 2.2," Sun Microsystems, Inc., Dec. 10, 1999, 384 pages.
Babu et al., "Exploiting k-Constraints to Reduce Memory Overhead in Continuous Queries Over Data Streams", ACM Transactions on Database Systems (TODS) vol. 29 Issue 3, Sep. 2004, 36 pages.
Tho et al. "Zero-latency data warehousing for heterogeneous data sources and continuous data streams," 5th International Conference on Information Integrationand Web-based Applications Services (Sep. 2003) 12 pages.
"SQL Subqueries"—Dec. 3, 2011, 2 pages.
"Caching Data with SqiDataSource Control"—Jul. 4, 2011, 3 pages.
"SCD—Slowing Changing Dimensions in a Data Warehouse"—Aug. 7, 2011, one page.
Non-Final Office Action for U.S. Appl. No. 13/838,259 dated Oct. 24, 2014, 21 pages.
Notice of Allowance for U.S. Appl. No. 13/102,665 dated Nov. 24, 2014, 9 pages.

(56) References Cited

OTHER PUBLICATIONS

Non-Final Office Action for U.S. Appl. No. 13/827,631 dated Nov. 13, 2014, 10 pages.
Non-Final Office Action for U.S. Appl. No. 13/827,987 dated Nov. 6, 2014, 9 pages.
Non-Final Office Action for U.S. Appl. No. 11/601,415 dated Oct. 6, 2014, 18 pages.
Non-Final Office Action for U.S. Appl. No. 14/077,230 dated Dec. 4, 2014, 30 pages.
Non-Final Office Action for U.S. Appl. No. 13/828,640 dated Dec. 2, 2014, 11 pages.
Non-Final Office Action for U.S. Appl. No. 13/830,428 dated Dec. 5, 2014, 23 pages.
Non-Final Office Action for U.S. Appl. No. 13/830,502 dated Nov. 20, 2014, 25 pages.
Non-Final Office Action for U.S. Appl. No. 13/839,288 dated Dec. 4, 2014, 30 pages.
SQL Tutorial-In, Tizag.com, http://web.archive.org/web/20090216215219/http://www.tizag.com/sqiTutorial/sqlin.php, Feb. 16, 2009, pp. 1-3.
Notice of Allowance for U.S. Appl. No. 11/977,437 dated Jul. 10, 2013, 10 pages.
Bottom-up parsing, Wikipedia, downloaded from: http://en.wikipedia.org/wiki/Bottom-up_parsing, Sep. 8, 2014, pp. 1-2.
Branch Predication, Wikipedia, downloaded from: http://en.wikipedia.org/wiki/Branch_predication, Sep. 8, 2014, pp. 1-4.
Microsoft Computer Dictionary, 5th Edition, Microsoft Press, Redmond, WA, 2002, pp. 238-239 and 529.
Notice of Allowance for U.S. Appl. No. 13/089,556 dated Oct. 6, 2014, 9 pages.
U.S. Appl. No. 12/396,464, Notice of Allowance mailed on Sep. 3, 2014, 7 pages.
U.S. Appl. No. 12/548,187, Advisory Action mailed on Sep. 26, 2014, 6 pages.
U.S. Appl. No. 12/548,281, Final Office Action mailed on Aug. 13, 2014, 19 pages.
U.S. Appl. No. 12/957,201, Non-Final Office Action mailed on Jul. 30, 2014, 12 pages.
U.S. Appl. No. 13/764,560, Non-Final Office Action mailed on Sep. 12, 2014, 23 pages.
U.S. Appl. No. 13/770,969, Non-Final Office Action mailed on Aug. 7, 2014, 9 pages.
U.S. Appl. No. 14/302,031, Non-Final Office Action mailed on Aug. 27, 2014, 19 pages.
Abadi et al., Aurora: a new model and architecture for data stream management, The VLDB Journal the International Journal on Very Large Data Bases, vol. 12, No. 2, Aug. 1, 2003, pp. 120-139.
Balkesen et al., Scalable Data Partitioning Techniques for Parallel Sliding Window Processing over Data Streams, 8th International Workshop on Data Management for Sensor Networks, Aug. 29, 2011, pp. 1-6.
Chandrasekaran et al., PSoup: a system for streaming queries over streaming data, The VLDB Journal the International Journal on Very Large Data Bases, vol. 12, No. 2, Aug. 1, 2003, pp. 140-156.
Dewson, Beginning SQL Server 2008 for Developers: From Novice to Professional, A Press, Berkeley, CA, 2008, pp. 337-349 and 418-438.
Harish D et al., Identifying robust plans through plan diagram reduction, PVLDB '08, Auckland, New Zealand, Aug. 23-28, pp. 1124-1140.
Krämer, Continuous Queries Over Data Streams—Semantics and Implementation, Fachbereich Mathematik und Informatik der Philipps-Universitat, Marburg, Germany, Retrieved from the Internet: URL:http://archiv.ub.uni-marburg.de/dissjz007/0671/pdfjdjk.pdf, Jan. 1, 2007; 313 pages.
International Application No. PCT/US2013/062047, International Search Report and Written Opinion mailed on Jul. 16, 2014, 12 pages.
International Application No. PCT/US2013/062050, International Search Report & Written Opinion mailed on Jul. 2, 2014, 13 pages.
International Application No. PCT/US2013/062052, International Search Report & Written Opinion mailed on Jul. 3, 2014, 12 pages.
International Application No. PCT/US2013/073086, International Search Report and Written Opinion mailed on Mar. 14, 2014.
International Application No. PCT/US2014/017061, International Search Report and Written Opinion mailed on Sep. 9, 2014, 12 pages.
Rao et al., Compiled Query Execution Engine using JVM, ICDE '06, Atlanta, GA, Apr. 3-7, 2006, 12 pages.
Ray et al., Optimizing complex sequence pattern extraction using caching, data engineering workshops (ICDEW)~ 2011 IEEE 27th international conference on IEEE, Apr. 11, 2011, pp. 243-248.
Shah et al., Flux: an adaptive partitioning operator for continuous query systems, Proceedings of the 19th International Conference on Data Engineering, Mar. 5-8, 2003, pp. 25-36.
Stillger et al., LEO—DB2's LEarning Optimizer, Proc. of the VLDB, Roma, Italy, Sep. 2001, pp. 19-28.
U.S. Appl. No. 12/548,281, Final Office Action mailed on Oct. 10, 2013, 21 pages.
U.S. Appl. No. 12/949,081, Final Office Action mailed on Aug. 27, 2013, 13 pages.
"Complex Event Processing in the Real World," an Oracle White Paper, Sep. 2007, 13 pages.
"Creating WebLogic Domains Using the Configuration Wizard," BEA Products, Dec. 2007, ver. 10.0, 78 pages.
"Creating Weblogic Event Server Applications," BEA WebLogic Event Server, Jul. 2007, ver. 2.0, 90 pages.
"Dependency Injection," Wikipedia, Dec. 30, 2008, printed on Apr. 29, 2011, at URL: http:en.wikipedia.org/w/index.php?title=Dependency_injection&oldid=260831402, pp. 1-7.
"Deploying Applications to WebLogic Server," BEA WebLogic Server, Mar. 30, 2007, ver. 10.0, 164 pages.
"Developing Applications with Weblogic Server," BEA WebLogic Server, Mar. 30, 2007, ver. 10.0, 254 pages.
"EPL Reference," BEA WebLogic Event Server, Jul. 2007, ver. 2.0, 82 pages.
"Fast Track Deployment and Administrator Guide for BEA WebLogic Server," BEA WebLogic Server 10.0 Documentation, printed on May 10, 2010, at URL: http://download.oracle.com/docs/cd/E13222_01/wls/docs100/quickstart/quick_start.html, 1 page.
"Getting Started with WebLogic Event Server," BEA WebLogic Event Server, Jul. 2007, ver. 2.0, 66 pages.
"Installing Weblogic Real Time," BEA WebLogic Real Time, Jul. 2007, ver. 2.0, 64 pages.
"Introduction to BEA WebLogic Server and BEA WebLogic Express," BEA WebLogic Server, Mar. 2007, ver. 10.0, 34 pages.
"Introduction to WebLogic Real Time," BEA WebLogic Real Time, Jul. 2007, ver. 2.0, 20 pages.
"Jboss Enterprise Application Platform 4.3 Getting Started Guide CP03, for Use with Jboss Enterprise Application Platform 4.3 Cumulative Patch 3," Jboss a division of Red Hat, Red Hat Documentation Group, Publication date Sep. 2007, Copyright 2008, 68 pages, Red Hat, Inc.
"Managing Server Startup and Shutdown," BEA WebLogic Server, Mar. 30, 2007, ver. 10.0, 134 pages.
"Matching Behavior,".NET Framework Developer's Guide, pp. 1-2, Copyright 2008 Microsoft Corporation, downloaded Jul. 1, 2008 from URL: http://msdn.microsoft.com/en-us/library/0yzc2yb0(printer).aspx.
"New Project Proposal for Row Pattern Recognition—Amendment to SQL with Application to Streaming Data Queries," H2-2008-027, H2 Teleconference Meeting, Jan. 9, 2008, pp. 1-6.
"Oracle CEP Getting Started," Release 11gR1 (11.1.1) E14476-01, May 2009, 172 pages.
"Oracle Complex Event Processing CQL Language Reference," 11g Release 1 (11.1.1) E12048-01, Apr. 2010, 540 pages.
"OSGI Service Platform Core Specification, The OSGI Alliance," Apr. 2007, ver. 4.1, release 4, 288 pages, OSGI Alliance.
"Release Notes," BEA WebLogic Event Server, Jul. 2007, ver. 2.0, 8 pages.
"Stanford Stream Data Manager," at URL: http://infolab.stanford.edu/stream/, last modified Jan. 5, 2006, pp. 1-9.
"Stream: The Stanford Stream Data Manager," IEEE Data Engineering Bulletin, Mar. 2003, pp. 1-8.

(56) References Cited

OTHER PUBLICATIONS

"StreamBase New and Noteworthy," StreamBase, dated Jan. 12, 2010, 878 pages.
"Understanding Domain Configuration," BEA WebLogic Server, Mar. 30, 2007, ver. 10.0, 38 pages.
"WebLogic Event Server Administration and Configuration Guide," BEA WebLogic Event Server, Jul. 2007, ver. 2.0, 108 pages.
"WebLogic Event Server Reference," BEA WebLogic Event Server, Jul. 2007, ver. 2.0, 52 pages.
"Weblogic Server Performance and Tuning," BEA WebLogic Server, Mar. 30, 2007, ver. 10.0, 180 pages.
"WebSphere Application Server V6.1 Problem Determination: IBM Redpaper Collection," WebSphere Software, IBM/Redbooks, Dec. 2007, 634 pages.
"Coral8 Complex Event Processing Technology Overview," Coral8, Inc., Make it Continuous, pp. 1-8, Copyright 2007 Coral8, Inc.
Abadi, D., et al., "Aurora: A Data Stream Management System," International Conference on Management of Data, Proceedings of the 2003 ACM SIGMOD International Conference on Management of Data, ACM Press, 2003, 4 pages.
Aho, A. et al., "Efficient String Matching: An Aid to Bibliographic Search," Communications of the ACM, Jun. 1975, vol. 18, No. 6, pp. 333-340, Copyright 1975, Association for Computing Machinery, Inc.
Arasu, "CQL: A language for Continuous Queries over Streams and Relations," Lecturs Notes in Computer Science, 2004, vol. 2921/2004, pp. 1-19.
Arasu, A., et al., "The CQL Continuous Query Language: Semantic Foundations and Query Execution," Stanford University, The VLDB Journal—The International Journal on Very Large Data Bases, vol. 15, Issue 2, Springer-Verlag New York, Inc., Jun. 2006, pp. 1-32.
Arasu, et al., "An Abstract Semantics and Concrete Language for Continuous Queries over Streams and Relations," 9th International Workshop on Database programming languages, Sep. 2003, 12 pages.
Arasu, et al., "Stream: The Stanford Data Stream Management System," Department of Computer Science, Stanford University, 2004, p. 21.
Avnur, et al., "Eddies: Continuously Adaptive Query Processing," In Proceedings of the 2000 ACM SIGMOD International Conference on Data, Dallas TX, May 2000, 12 pages.
Avnur, et al., "Eddies: Continuously Adaptive Query Processing," slide show, believed to be prior to Oct. 17, 2007, 4 pages.
Babcock et al., "Models and Issues in Data Streams," Proceedings of the 21st ACM SIGMOD-SIGACT-SIDART symposium on Principles of database systems, 2002, 30 pages.
Babu, et al., "Continuous Queries over Data Streams," SIGMOD Record, Sep. 2001, vol. 30, No. 3, pp. 109-120.
Bai, Y., et al., "A Data Stream Language and System Designed for Power and Extensibility," Conference on Information and Knowledge Management, Proceedings of the 15th ACM International Conference on Information and Knowledge Management, Arlington, Virginia, Nov. 5-11, 2006, 10 pages, ACM Press, Copyright 2006.
Bose, S. et al., "A Query Algebra for Fragmented XML Stream Data", 9th International Conference on Data Base Programming Languages (DBPL), Sep. 6-8, 2003, Postdam, Germany, at URL: http://lambda.uta.edu/dbp103.pdf, 11 pages.
Buza, "Extension of CQL over Dunamic Databases," Journal of Universal Computer Science, 2006, vol. 12, No. 9, pp. 1165-1176.
Carpenter, "User Defined Functions," Oct. 12, 2000, at URL: http://www.sqlteam.com/itemprint.asp?ItemID=979, 4 pages.
Chan, et al., "Efficient Filtering of XML documents with Xpath expressions," VLDB Journal, 2002, pp. 354-379.
Chandrasekaran, et al., "TelegraphCQ: Continuous Dataflow Processing for an Uncertain World," Proceedings of CIDR 2003, p. 12.
Chen, J., et al., "NiagaraCQ: A Scalable Continuous Query System for Internet Databases," Proceedings of the 2000 SIGMOD International Conference on Management of Data, May 2000, pp. 379-390.
Colyer, et al., "Spring Dynamic Modules Reference Guide," Copyright 2006-2008, ver. 1.0.3, 73 pages.
Colyer, et al., "Spring Dynamic Modules Reference Guide," Copyright 2006-2008, ver. 1.1.3, 96 pages.
Conway, N., "An Introduction to Data Stream Query Processing," Truviso, Inc., May 24, 2007, 71 pages, downloaded from: http://neilconway.org/talks/stream_intro.pdf.
Demers, A. et al., "Towards Expressive Publish/Subscribe Systems," in Proceedings of the 10th International Conference on Extending Database Technology (EDBT 2006), Munich, Germany, Mar. 2006, pp. 1-18.
DeMichiel, et al., "JSR 220: Enterprise JavaBeans™, EJB 3.0 Simplified API," EJB 3.0 Expert Group, Sun Microsystems, May 2, 2006, ver. 3.0, 59 pages.
Deshpande, et al., "Adaptive Query Processing," slide show believed to be prior to Oct. 17, 2007, 27 pages.
Diao, Y. "Query Processing for Large-Scale XML Message Brokering", 2005, University of California Berkeley, 226 pages.
Diao, Y. et al. "Query Processing for High-Volume XML Message Brokering", Proceedings of the 29th VLDB Conference, Berlin, Germany, 2003, 12 pages.
Dindar, N., et al., "Event Processing Support for Cross-Reality Environments," Pervasive Computing, IEEE CS, Jul.-Sep. 2009, pp. 2-9, Copyright 2009 IEEE.
Esper Reference Documentation, Copyright 2007, ver. 1.12.0, 158 pages.
Esper Reference Documentation, Copyright 2008, ver. 2.0.0, 202 pages.
Esper Reference Documentation, Copyright 2009, ver. 3.1.0, 293 pages.
Fernandez, Mary et al., "Build your own XQuery processor", slide show, at URL: http://www.galaxquery.org/slides/edbt-summer-school2004.pdf, 2004, 116 pages.
Fernandez, Mary et al., Implementing XQuery 1.0: The Galax Experience:, Proceedings of the 29th VLDB Conference, Berlin, Germany, 2003, 4 pages.
Florescu, Daniela et al., "The BEA/XQRL Streaming XQuery Processor", Proceedings of the 29th VLDB Conference, 2003, Berlin, Germany, 12 pages.
Gilani, A. Design and implementation of stream operators, query instantiator and stream buffer manager, Dec. 2003, 137 pages.
Golab, "Sliding Window Query Processing Over Data Streams," University of Waterloo, Waterloo, Ont. Canada, Aug. 2006, 182 pages.
Golab, L., et al., "Issues in Data Stream Management," ACM SIGMOD Record, vol. 32, Issue 2, Jun. 2003, ACM Press, pp. 5-14.
Gosling, et al., "The Java Language Specification," Book, copyright 1996-2005, 3rd edition, 684 pages, Sun Microsystems USA.
Hao et al. "Achieving high performance web applications by service and database replications at edge servers," proceedings of IPCCC 2009, IEEE 28th International Performance Computing and Communications Conference, pp. 153-160 (Dec. 2009).
Hopcroft, J. E., "Introduction to Automata Theory, Languages, and Computation," Second Edition, Addison-Wesley, Copyright 2001, 1-521 pages.
Hulton et al. "Mining Time-Changing Data Streams," Proceedings of the Seventh ACM SIGKDD, pp. 10 (Aug. 2001).
Jin, C. et al. "ARGUS: Efficient Scalable Continuous Query Optimization for Large-Volume Data Streams" lOth International Database Engineering and Applications Symposium (IDEAS'06), 2006, pp. 7.
Kawaguchi, Kohsuke, "Java Architecture for XML Binding (JAXB) 2.0", Sun Microsystems, Inc., Apr. 19, 2006, 384 pages.
Knuth, D. E., et al., "Fast Pattern Matching in Strings," SIAM J. Comput., vol. 6, No. 2, Jun. 1977, pp. 323-350.
Lakshmanan, et al., "On efficient matching of streaming XML documents and queries," 2002, 18 pages.
Lindholm, T. and Yellin, F., "Java Virtual Machine Specification, 2nd Edition", Prentice Hall, Apr. 1999, 484 pages.
Liu, et al., "Efficient XSLT Processing in Relational Database System," Proceeding of the 32nd. International Conference on Very Large Data Bases (VLDB), Sep. 2006, 1106-1116, 11 pages.
Luckham, D., "What's the Difference Between ESP and CEP?" Complex Event Processing, downloaded Apr. 29, 2011, 5 pages, at URL: http://complexevents.com/?p=103.

(56) References Cited

OTHER PUBLICATIONS

Madden, et al., "Continuously Adaptive Continuous Queries (CACQ) over Streams," SIGMOD 2002, Jun. 4-6, 2002, 12 pages.
Martin et al "Finding application errors and security flaws using PQL: a program query language," Proceedings of the 20th annual ACM SIGPLAN conference on Object-oriented programming, systems, languages, and applications 40:1-19 (Oct. 2005).
Motwani, et al., "Query Processing Resource Management, and Approximation in a Data Stream Management System," Proceedings of CIDR 2003, Jan. 2003, 12 pages.
Munagala, et al., "Optimization of Continuous Queries with Shared Expensive Filters," Proceedings of the 26th ACM SIGMOD-SIGACT-SIGART symposium on Principles of database systems, believed to be prior to Oct. 17, 2007, p. 14.
Nah et al. "A Cluster-Based THO-Structured Scalable Approach for Location Information Systems," The Ninth IEEE International Workshop on Object-Oriented Real-Time Dependable Systems (WORDS' 03), pp. 225-233 (Jan. 1, 2003).
Novick, "Creating a User Definded Aggregate with SQL Server 2005," at URL: http://novicksoftware.com/Articles/sql-2005-product-user-defined-aggregate.html, 2005, 6 pages.
Oracle Application Server 10g, Release 2 and 3, New Features Overview, An Oracle White Paper, Oct. 2005, 48 pages.
Oracle Application Server, Administrator's Guide, 10g Release 3 (10.1.3.2.0), B32196-01, Jan. 2007, 376 pages, Oracle.
Oracle Application Server, Enterprise Deployment Guide, 10g Release 3 (10.1.3.2.0), B32125-02, Apr. 2007, 120 pages, Oracle.
Oracle Application Server, High Availability Guide, 10g Release 3 (10.1.3.2.0), B32201-01, Jan. 2007, 314 pages, Oracle.
Oracle Database Data Cartridge Developer's Guide, B28425-03, 11g Release 1 (11.1), Oracle, Mar. 2008, 372 pages.
Oracle Database, SQL Language Reference, 11g Release 1 (11.1), B28286-02, Sep. 2007, 1496 pages.
Oracle Database, SQL Reference, 10g Release 1 (10.1), Part No. B10759-01, Dec. 2003, pp. 7-1 to 7-17; 7-287 to 7-290; 14-61 to 14-74.
Peng, et al., "Xpath Queries on Streaming Data," 2003, pp. 1-12, ACM Press.
Peterson, "Petri Net Theory and the Modeling of Systems", Prentice Hall, 1981, 301 pages.
PostgresSQL: Documentation: Manuals: PostgresSQL 8.2: Create Aggregate, believed to be prior to Apr. 21, 2007, 4 pages.
PostgresSQL: Documentation: Manuals: PostgresSQL 8.2: User-Defined Aggregates, believed to be prior to Apr. 21, 2007, 4 pages.
Sadri, R., et al., "Expressing and Optimizing Sequence Queries in Database Systems," ACM Transactions on Database Systems, vol. 29, No. 2, Jun. 2004, pp. 282-318, ACM Press, Copyright 2004.
Sadtler, et al., "WebSphere Application Server Instalation Problem Determination," Copyright 2007, pp. 1-48, IBM Corp.
Sansoterra "Empower SOL with Java User-Defined Functions," IT Jungle.com (Oct. 9, 2003).
Sharaf, et al., Efficient Scheduling of Heterogeneous Continuous Queries, VLDB '06, Sep. 12-15, 2006, pp. 511-522.
Spring Dynamic Modules for OSGi Service Platforms product documentation, SpringSource, Jan. 2008, 71 pages.
Stolze, "User-defined Aggregate Functions in DB2 Universal Database," at URL: http://www.128.ibm.com/developerworks/db2/library/tacharticle/0309stolze/0309stolze.html, Sep. 11, 2003, 9 pages.
Stream Query Repository: Online Auctions (CQL Queries), at URL: http://www-db.stanford.edu/strem/sqr/cql/onauc.html, Dec. 2, 2002, 4 pages.
Stream Query Repository: Online Auctions, at URL: http://www-db.stanford.edu/stream/sqr/onauc.html#queryspecsend, Dec. 2, 2002, 2 pages.
Stump et al. (ed.) Proceedings of IJCAR '06 Workshop "PLPV '06: Programming Languages meets Program Verification," pp. 1-113 (Aug. 21, 2006).
Terry, et al., "Continuous queries over append-only database," Proceedings of 1992 ACM SIGMOD, pp. 321-330.
Ullman et al., "Introduction to JDBC," Stanford University (2005).
Vajjhala, et al, "The Java™ Architecture for XML Binding (JAXB) 2.0," Sun Microsystem, Inc., Final Release Apr. 19, 2006, 384 pages.
Vijayalakshmi et al. "Processing location dependent continuous queries in distributed mobile databases using mobile agents," IET-UK International Conference on Information and Communication Technology in Electrical Sciences (ICTES 2007), pp. 1023-1030 (Dec. 22, 2007).
W3C, "XML Path Language (Xpath)," W3C Recommendation, Nov. 16, 1999, ver. 1.0, at URL: http://www.w3.org/TR/xpath, 37 pages.
Wang et al. "Distributed Continuous Range Query Processing on Moving Objects," Proceedings of the 17th international Conference on Database and Expert Systems Applications (DEXA'06), Berlin, DE, pp. 655-665 (Jan. 1, 2006).
White, S., et al., "WebLogic Event Server: A Lightweight, Modular Application Server for Event Processing," 2nd International Conference on Distributed Event-Based Systems, Jul. 2-4, 2008, Rome, Italy, 8 pages, ACM Press, Copyright 2004.
Widom, et al., "CQL: A Language for Continuous Queries over Streams and Relations," believed to be prior to Oct. 17, 2007, 62 pages.
Widom, et al., "The Stanford Data Stream Management System," PowerPoint Presentation, believed to be prior to Oct. 17, 2007, 110 pages.
Wu et al. "Dynamic Data Management for Location Based Services in Mobile Environments," IEEE Proceedings of the Seventh International Database Engineering and Applications Symposium 2003 Piscataway. NJ. USA., pp. 172-181 (Jul. 16, 2003).
Zemke, "XML Query," Mar. 14, 2004, 29 pages.
Non-Final Office Action for U.S. Appl. No. 12/548,290, mailed on Oct. 3, 2011, 34 pages.
Non-Final Office Action for U.S. Appl. No. 12/548,281, mailed on Oct. 3, 2011, 37 pages.
Non-Final Office Action for U.S. Appl. No. 12/534,398, mailed on Nov. 1, 2011, 32 pages.
Non-Final Office Action for U.S. Appl. No. 12/548,222, mailed on Oct. 17, 2011, 27 pages.
Non-Final Office Action for U.S. Appl. No. 12/548,187, mailed on Sep. 27, 2011, 19 pages.
Non-Final Office Action for U.S. Appl. No. 12/396,008, mailed on Jun. 8, 2011, 10 pages.
Notice of Allowance for U.S. Appl. No. 12/396,008, mailed on Nov. 16, 2011, 27 pages.
Non-Final Office Action for U.S. Appl. No. 12/395,871, mailed on May 27, 2011, 7 pages.
Final Office Action for U.S. Appl. No. 12/395,871, mailed on Oct. 19, 2011, 33 pages.
Non-Final Office Action for U.S. Appl. No. 11/874,202, mailed on Dec. 3, 2009, 20 pages.
Final Office Action for U.S. Appl. No. 11/874,202, mailed on Jun. 8, 2010, 18 pages.
Notice of Allowance for U.S. Appl. No. 11/874,202, mailed on Dec. 22, 2010, 23 pages.
Notice of Allowance for U.S. Appl. No. 11/874,202, mailed on Mar. 31, 2011, 12 pages.
Notice of Allowance for U.S. Appl. No. 11/874,850, mailed on Nov. 24, 2009, 17 pages.
Supplemental Notice of Allowance for U.S. Appl. No. 11/874,850, mailed on Dec. 11, 2009, 5 pages.
Supplemental Notice of Allowance for U.S. Appl. No. 11/874,850, mailed on Jan. 27, 2010, 11 pages.
Non-Final Office Action for U.S. Appl. No. 11/874,896, mailed on Dec. 8, 2009, 19 pages.
Final Office Action for U.S. Appl. No. 11/874,896, mailed on Jul. 23, 2010, 28 pages.
Non-Final Office Action for U.S. Appl. No. 11/874,896, mailed on Nov. 22, 2010, 25 pages.
Notice of Allowance for U.S. Appl. No. 11/874,896, mailed on Jun. 23, 2011, 30 pages.
Non-Final Office Action for U.S. Appl. No. 11/977,439, mailed on Apr. 13, 2010, 11 pages.
Notice of Allowance for U.S. Appl. No. 11/977,439, mailed on Aug. 18, 2010, 11 pages.

(56) References Cited

OTHER PUBLICATIONS

Supplemental Notice of Allowance for U.S. Appl. No. 11/977,439, mailed on Sep. 28, 2010, 6 pages.
Notice of Allowance for U.S. Appl. No. 11/977,439, mailed on Nov. 24, 2010, 8 pages.
Notice of Allowance for U.S. Appl. No. 11/977,439, mailed on Mar. 16, 2011, 10 pages.
Non-Final Office Action for U.S. Appl. No. 11/977,437, mailed on Oct. 13, 2009, 12 pages.
Final Office Action for U.S. Appl. No. 11/977,437, mailed on Apr. 8, 2010, 20 pages.
Notice of Allowance for U.S. Appl. No. 11/977,440, mailed on Oct. 7, 2009, 9 pages.
Office Action for U.S. Appl. No. 11/874,197, mailed on Nov. 10, 2009, 17 pages.
Final Office Action for U.S. Appl. No. 11/874,197, mailed on Jun. 29, 2010, 19 pages.
Non-Final Office Action for U.S. Appl. No. 11/874,197, mailed on Dec. 22, 2010, 29 pages.
Final Office Action for U.S. Appl. No. 11/874,197, mailed on Aug. 12, 2011, 26 pages.
Non-Final Office Action for U.S. Appl. No. 11/873,407, mailed on Nov. 13, 2009, 10 pages.
Final Office Action for U.S. Appl. No. 11/873,407, mailed on Apr. 26, 2010, 12 pages.
Notice of Allowance for U.S. Appl. No. 11/873,407, mailed on Nov. 10, 2010, 14 pages.
Notice of Allowance for U.S. Appl. No. 11/873,407, mailed on Mar. 7, 2011, 11 pages.
Non-Final Office Action for U.S. Appl. No. 11/601,415, mailed on Sep. 17, 2008, 13 pages.
Final Office Action for U.S. Appl. No. 11/601,415, mailed on May 27, 2009, 30 pgaes.
Non-Final Office Action for U.S. Appl. No. 11/601,415, mailed on Nov. 30, 2009, 33 pages.
Final Office Action for U.S. Appl. No. 11/601,415, mailed on Jun. 30, 2010, 45 pages.
Non-Final Office Action for U.S. Appl. No. 11/927,681, mailed on Mar. 24, 2011, 17 pages.
Notice of Allowance for U.S. Appl. No. 11/927,681, mailed on Jul. 1, 2011, 8 pages.
Non-Final Office Action for U.S. Appl. No. 11/927,683, mailed on Mar. 24, 2011, 13 pages.
Final Office Action for U.S. Appl. No. 11/927,683, mailed on Sep. 1, 2011, 18 pages.
Notice of Allowance for U.S. Appl. No. 11/927,683, mailed on Nov. 9, 2011, 10 pages.
Non-Final Office Action for U.S. Appl. No. 10/948,523, mailed on Jan. 22, 2007, 55 pages.
Final Office Action for U.S. Appl. No. 10/948,523, mailed on Jul. 6, 2007, 42 pages.
Non-Final Office Action for U.S. Appl. No. 10/948,523, mailed Dec. 11, 2007, 52 pages.
Notice of Allowance for U.S. Appl. No. 10/948,523, mailed on Jul. 8, 2008, 38 pages.
Supplemental Notice of Allowance for U.S. Appl. No. 10/948,523, mailed on Aug. 25, 2008, 3 pages.
Notice of Allowance for U.S. Appl. No. 10/948,523, mailed on Dec. 1, 2010, 18 pages.
International Search Report dated for PCT/US2011/052019 (Nov. 17, 2011).
Notice of allowance U.S. Appl. No. 12/396,008 (Nov. 16, 2011).
Office Action for U.S. Appl. No. 12/506,891 (Dec. 14, 2011).
Office Action for U.S. Appl. No. 12/534,398 (Nov. 11, 2011).
Office Action for U.S. Appl. No. 11/601,415 (Dec. 9, 2011).
Office Action for U.S. Appl. No. 12/534,384 (Feb. 28, 2012).
Office Action for U.S. Appl. No. 12/506,905 (Mar. 26, 2012).
Notice of Allowance for U.S. Appl. No. 13/184,528 (Mar. 1, 2012).
Office Action for U.S. Appl. No. 12/548,209 (Apr. 16, 2012).
Office Action for U.S. Appl. No. 12/548,187 (Jun. 20, 2012).
Notice of Allowance for U.S. Appl. No. 12/395,871 (May 4, 2012).
Office Action for U.S. Appl. No. 12/548,222 (Jun. 20, 2012).
Office Action for U.S. Appl. No. 12/534,398 (Jun. 5, 2012).
Office Action for U.S. Appl. No. 12/548,281 (Jun. 20, 2012).
Office Action for U.S. Appl. No. 12/913,636 (Jun. 7, 2012).
Notice of Allowance for U.S. Appl. No. 12/874,197 (Jun. 22, 2012).
International Search Report dated Jul. 16, 2012 for PCT/US2012/034970.
Final Office Action for U.S. Appl. No. 12/548,290 dated Jul. 30, 2012.
Office Action for U.S. Appl. No. 13/193,377 dated Aug. 23, 2012.
Office Action for U.S. Appl. No. 11/977,437 dated Aug. 3, 2012.
Final Office Action for U.S. Appl. No. 11/601,415 dated Jul. 2, 2012.
Notice of Allowance for U.S. Appl. No. 12/506,891 dated Jul. 25, 2012.
Final Office Action for U.S. Appl. No. 12/506,905 dated Aug. 9, 2012.
International Search Report dated Sep. 12, 2012 for PCT/US2012/036353.
Office Action for U.S. Appl. No. 13/396,464 dated Sep. 7, 2012.
Office Action for U.S. Appl. No. 13/244,272 dated Oct. 14, 2012.
Notice of Allowance for U.S. Appl. No. 12/548,209 dated Oct. 24, 2012.
Non-Final Office Action for U.S. Appl. No. 12/957,194 dated Dec. 7, 2012.
Non-Final Office Action for U.S. Appl. No. 13/089,556 dated Nov. 6, 2012.
Notice of Allowance for U.S. Appl. No. 12/534,398 dated Nov. 27, 2012.
Notice of Allowance for U.S. Appl. No. 12/506,905 dated Dec. 14, 2012.
Non-Final Office Action for U.S. Appl. No. 12/957,201 dated Dec. 19, 2012.
Final Office Action for U.S. Appl. No. 12/396,464 dated Jan. 16, 2013, 16 pages.
Final Office Action for U.S. Appl. No. 12/913,636 dated Jan. 8, 2013, 20 pages.
Non-Final Office Action for U.S. Appl. No. 12/949,081 dated Jan. 9, 2013, 12 pages.
Final Office Action for U.S. Appl. No. 12/193,377 dated Jan. 17, 2013, 24 pages.
Final Office Action for U.S. Appl. No. 12/534,384 dated Feb. 12, 2013, 13 pages.
Final Office Action for U.S. Appl. No. 13/107,742 dated Feb. 14, 2013, 15 pages.
Non-Final Office Action for U.S. Appl. No. 13/102,665 dated Feb. 1, 2013, 11 pages.
Business Process Management (BPM), Datasheet [online]. IBM, [retrieved on Jan. 28, 2013]. Retrieved from the Internet: <URL: http://www-142.ibm.com/software/products/us/en/category/BPM-SOFTWARE>.
What is BPM? Datasheet [online]. IBM, [retrieved on Jan. 28, 2013]. Retrieved from the Internet: <URL: http://www-01.ibm.com/software/info/bpm/whatis-bpm/>.
U.S. Appl. No. 12/534,384, Notice of Allowance mailed on May 7, 2013, 12 pages.
U.S. Appl. No. 12/548,187, Non-Final Office Action mailed on Apr. 9, 2013, 17 pages.
U.S. Appl. No. 12/548,222, Non-Final Office Action mailed on Apr. 10, 2013, 16 pages.
U.S. Appl. No. 12/548,281, Non-Final Office Action mailed on Apr. 13, 2013, 16 pages.
U.S. Appl. No. 12/548,290, Non-Final Office Action mailed on Apr. 15, 2013, 17 pages.
U.S. Appl. No. 12/957,201, Final Office Action mailed on Apr. 25, 2013, 11 pages.
U.S. Appl. No. 13/089,556, Non-Final Office Action mailed on Apr. 10, 2013, 10 pages.
U.S. Appl. No. 12/548,281, Non-Final Office Action mailed on Feb. 13, 2014, 16 pages.
U.S. Appl. No. 13/177,748, Final Office Action mailed on Mar. 20, 2014, 23 pages.

(56) References Cited

OTHER PUBLICATIONS

PCT Patent Application No. PCT/US2014/010832, International Search Report mailed on Apr. 3, 2014, 9 pages.
Cadonna et al., Efficient event pattern matching with match windows, Proceedings of the 18th ACM SIGKDD international conference on knowledge discovery and data mining (Aug. 2012), pp. 471-479.
Nichols et al., A faster closure algorithm for pattern matching in partial-order event data, IEEE International Conference on Parallel and Distributed Systems (Dec. 2007), pp. 1-9.
U.S. Appl. No. 12/949,081, Non-Final Office Action mailed on Jan. 28, 2015, 20 pages.
U.S. Appl. No. 12/957,201, Notice of Allowance mailed on Jan. 21, 2015, 5 pages.
U.S. Appl. No. 13/107,742, Final Office Action mailed on Jan. 21, 2015, 23 pages.
U.S. Appl. No. 13/177,748, Non-Final Office Action mailed on Feb. 3, 2015, 22 pages.
U.S. Appl. No. 13/770,969, Notice of Allowance mailed on Jan. 22, 2015, 5 pages.
U.S. Appl. No. 13/829,958, Non-Final Office Action mailed on Dec. 11, 2014, 15 pages.
U.S. Appl. No. 13/906,162, Non-Final Office Action mailed on Dec. 29, 2014, 10 pages.
International Application No. PCT/US2014/010832, Written Opinion mailed on Dec. 15, 2014, 5 pages.
International Application No. PCT/US2014/010920, International Search Report and Written Opinion mailed on Dec. 15, 2014, 10 pages.
International Application No. PCT/US2014/017061, Written Opinion mailed on Feb. 3, 2015, 6 pages.
International Application No. PCT/US2014/039771, International Search Report and Written Opinion mailed on Sep. 24, 2014, 12 pages.
Cranor et al. "Gigascope: a stream database for network applications," Proceedings of the 2003 ACM SIGMOD international conference on Management of data, pp. 647-651 (Jun. 2003).
Oracle® Complex Event Processing EPL Language Reference 11g Release 1 (11.1.1.4.0), E14304-02, Jan. 2011, 80 pages.
De Castro Alves, A General Extension System for Event Processing Languages, DEBS '11, New York, NY, USA, Jul. 11-15, 2011, pp. 1-9.
Takenaka et al., A scalable complex event processing framework for combination of SQL-based continuous queries and C/C++ functions, FPL 2012, Oslo, Norway, Aug. 29-31, 2012, pp. 237-242.
Tomàs et al., RoSeS: A Continuous Content-Based Query Engine for RSS Feeds, DEXA 2011, Toulouse, France, Sep. 2, 2011, pp. 203-218.
Non-Final Office Action for U.S. Appl. No. 13/830,378 dated Feb. 25, 2015, 23 pages.
Non-Final Office Action for U.S. Appl. No. 13/830,129 dated Feb. 27, 2015, 19 pages.
International Application No. PCT/US2014/068641, International Search Report and Written Opinion mailed on Feb. 26, 2015, 11 pages.
European Patent Application No. 12783063.6, Extended Search Report mailed Mar. 24, 2015, 6 pages.
Non-Final Office Action for U.S. Appl. No. 12/913,636 dated Apr. 1, 2015, 22 pages.
Final Office Action for U.S. Appl. No. 13/827,631 dated Apr. 3, 2015, 11 pages.
Notice of Allowance for U.S. Appl. No. 13/839,288 dated Apr. 3, 2015, 12 pages.
Notice of Allowance for U.S. Appl. No. 14/077,230 dated Apr. 16, 2015, 16 pages.
Final Office Action for U.S. Appl. No. 13/764,560 dated Apr. 15, 2015, 19 pages.
Final Office Action for U.S. Appl. No. 14/302,031 dated Apr. 22, 2015, 23 pages.
Non-Final Office Action for U.S. Appl. No. 14/692,674 dated Jun. 5, 2015, 22 pages.
Non-Final Office Action for U.S. Appl. No. 14/037,171 dated Jun. 3, 2015, 15 pages.
Non-Final Office Action for U.S. Appl. No. 14/830,735 dated May 26, 2015, 19 pages.
Final Office Action for U.S. Appl. No. 13/830,428 dated Jun. 4, 2015, 21 pages.
Non-Final Office Action for U.S. Appl. No. 14/838,259 dated Jun. 9, 2015, 37 pages.
Final Office Action for U.S. Appl. No. 14/906,162 dated Jun. 10, 2015, 10 pages.
Non-Final Office Action for U.S. Appl. No. 14/037,153 dated Jun. 19, 2015, 23 pages.
Final Office Action for U.S. Appl. No. 13/829,958 dated Jun. 19, 2015, 17 pages.
Final Office Action for U.S. Appl. No. 13/827,987 dated Jun. 19, 2015, 10 pages.
International Application No. PCT/US2014/039771, International Search Report and Written Opinion mailed on Apr. 29, 2015 6 pages.
International Application No. PCT/US2015/016346, International Search Report and Written Opinion mailed on May 4, 2015, 9 pages.
International Preliminary Report on Patentability dated Apr. 9, 2015 for PCT/US2013/062047, 10 pages.
International Preliminary Report on Patentability dated Apr. 9, 2015 for PCT/US2013/062052, 18 pages.
International Preliminary Report on Patentability dated May 28, 2015 for PCT/US2014/017061, 31 pages.
International Preliminary Report on Patentability dated Jun. 18, 2015 for PCT/US2013/073086, 7 pages.
"Data stream management system", Wikipedia, downloaded from en.wikipedia.org/wiki/Data_stream_management_system on Sep. 23, 2015, pp. 1-5.
Josifovsky, Vanja, et al., "Querying XML Streams", The VLDB Journal, vol. 14, © 2005, pp. 197-210.
Purvee, Edwin Ralph, "Optimizing SPARQLeR Using Short Circuit Evaluation of Filter Clauses", Master of Science Thesis, Univ. of Georgia, Athens, GA, © 2009, 66 pages.
Weidong, Yang, et al., "LeoXSS: An Efficient XML Stream System for Processing Complex XPaths", CIT 2006, Seoul, Korea, © 2006, 6 pages.
Final Office Action for U.S. Appl. No. 13/177,748 dated Aug. 21, 2015, 24 pages.
Non-Final Office Action for U.S. Appl. No. 14/036,500 dated Aug. 14, 2015, 26 pages.
Notice of Allowance for U.S. Appl. No. 13/830,129 dated Sep. 22, 2015, 9 pages.
Non-Final Office Action for U.S. Appl. No. 13/764,560 dated Oct. 6, 2015, 18 pages.
Non-Final Office Action for U.S. Appl. No. 14/621,098 dated Oct. 15, 2015, 21 pages.
Notice of Allowance for U.S. Appl. No. 14/692,674 dated Oct. 15, 2015, 10 pages.
Notice of Allowance for U.S. Appl. No. 14/037,171 dated Oct. 15, 2015, 14 pages.
Japan Patent Office office actions JPO patent application JP2013-529376 (Aug. 18, 2015).
Non-Final Office Action for U.S. Appl. No. 14/079,538 dated Oct. 22, 2015, 34 pages.
Non-Final Office Action for U.S. Appl. No. 13/906,162 dated Oct. 28, 2015, 11 pages.
Notice of Allowance for U.S. Appl. No. 14/302,031 dated Nov. 3, 2015, 18 pages.
Final Office Action for U.S. Appl. No. 12/949,081 dated Nov. 17, 2015, 19 pages.
China Patent Office office actions for patent application CN201180053021.4 (Oct. 28, 2015).
Notice of Allowance for U.S. Appl. No. 12/913,636 dated Oct. 27, 2015, 22 pages.
Final Office Action for U.S. Appl. No. 13/830,378 dated Nov. 5, 2015, 28 pages.
Non-Final Office Action for U.S. Appl. No. 13/830,502 dated Dec. 11, 2015, 25 pages.
Non-Final Office Action for U.S. Appl. No. 13/828,640 dated Jun. 17, 2015, 11 pages.

(56) References Cited

OTHER PUBLICATIONS

Non-Final Office Action for U.S. Appl. No. 11/601,415 dated Nov. 13, 2015, 18 pages.
China Patent Office office actions for patent application CN201280022008.7 (Dec. 3, 2015).
European Application No. 12783063.6, Office Action mailed on Nov. 11, 2015, 8 pages.
Notice of Allowance for U.S. Appl. No. 12/548,187, dated Feb. 2, 2016, 15 pages.
Notice of Allowance for U.S. Appl. No. 14/037,072 dated Feb. 16, 2016, 17 pages.
Final Office Action for U.S. Appl. No. 13/830,735 dated Dec. 21, 2015, 20 pages.
Notice of Allowance for U.S. Appl. No. 13/827,987 dated Jan. 4, 2016, 16 pages.
Notice of Allowance for U.S. Appl. No. 13/177,748 dated Jan. 6, 2016, 9 pages.
Notice of Allowance for U.S. Appl. No. 13/828,640 dated Jan. 6, 2016, 16 pages.
Non-Final Office Action for U.S. Appl. No. 13/830,428 dated Jan. 15, 2016, 25 pages.
Final Office Action for U.S. Appl. No. 14/037,153 dated Jan. 21, 2016, 31 pages.
Non-Final Office Action for U.S. Appl. No. 13/829,958 dated Feb. 1, 2016, 20 pages.
Non-Final Office Action for U.S. Appl. No. 13/827,631 dated Feb. 11, 2016, 12 pages.
Ghazal et al., Dynamic plan generation for parameterized queries, Jul. 2009, 7 pages.
Chaudhuri et al., Variance aware optimization of parameterized queries, Jun. 2010, 12 pages.
Seshadri et al., SmartCQL: Semantics to Handle Complex Queries over Data Streams, 2010, 5 pages.
International Search Report and Written Opinion dated Dec. 15, 2015 for PCT/US2015/051268, 17 Pages.
"11 Oracle Event Processing NoSQL 1-20 Database Data Cartridge—11g Release 1 (11.1.1.7) 11," Oracle Fusion Middleware CQL Language Reference for Oracle Event Processing 11g Release 1 (11.1.1.7), 4 pages (Sep. 25, 2013).
Oracle Event Processing Hadoop Data Cartridge—11g Release 1(11.1.1.7), Oracle Fusion Middleware CQL LanguageReference for Oracle Event Processing 11g Release 1 (11.1.1.7) 4 pages (Sep. 25, 2013).
Liu "Hbase Con 2014: HBase Design Patterns @Yahoo!" (May 5, 2014), 20 pages.
Hasan et al. "Towards unified and native enrichment in event processing systems," Proceedings of the 7th ACM international conference on Distributed event-based systems, pp. 171-182 (Jun. 29, 2013).
Katsov "In-Stream Big Data Processing : Highly Scalable Blog" 20 pages (Aug. 20, 2013).
Katsov "In-Stream Big Data Processing : Highly Scalable Blog" 19 pages (Aug. 29, 2014).
Notice of Allowance for U.S. Appl. No. 12/548,187 dated Aug. 17, 2015, 18 pages.
Notice of Allowance for U.S. Appl. No. 13/107,742 dated Jul. 8, 2015, 9 pages.
Non-Final Office Actio for U.S. Appl. No. 14/037,072 dated Jul. 9, 2015, 12 pages.
Final Office Action for U.S. Appl. No. 13/830,502 dated Jun. 30, 2015, 25 pages.
Non-Final Office Action for U.S. Appl. No. 14/036,659 dated Aug. 13, 2015, 33 pages.
Non-Final Office Action for U.S. Appl. No. 13/830,759 dated Aug. 7, 2015, 23 pages.
International Preliminary Report on Patentability dated Jul. 29, 2015 for PCT/US2014/010920, 30 pages.
International Preliminary Report on Patentability dated Jul. 29, 2015 for PCT/US2014/039771, 24 pages.
Final Office Action for U.S. Appl. No. 13/830,759 dated Feb. 18, 2016, 18 pages.
Final Office Action for U.S. Appl. No. 13/838,259 dated Feb. 19, 2016, 47 pages.
Notice of Allowance for U.S. Appl. No. 13/906,162 dated Apr. 5, 2016, 7 pages.
Final Office Action for U.S. Appl. No. 14/036,500 dated Mar. 17, 2016, 34 pages.
Final Office Action for U.S. Appl. No. 13/764,560 dated Apr. 14, 2016, 20 pages.
Final Office Action for U.S. Appl. No. 14/621,098 dated Apr. 21, 2016, 16 pages.
Hirzel et al., "SPL Stream Processing Language Report", IBM Research Report RC24897, IBM Research Division, Thomas J. Watson Research center, Yorktown Heights, NY, Nov. 5, 2009, 19 pages.
Japan Patent Office office actions JPO patent application JP2014-509315 (Mar. 15, 2016).
Yosuke Watanabe et al., Development of a Data Stream Integration System with a Multiple Query Optimizer, Journal articles of the 15th Data Engineering Workshop (DEWS2004), The Institute of Electronics, Information and Communication Engineers, Technical Committee on Data Engineering, Aug. 11, 2009, pp. 1-8.
Shuhei Kuwata et al., Stream Data Analysis Application for Customer Behavior with Complex Event Processing, IEICE Technical Report, The Institute of Electronics, Information and Communication Engineers, Jun. 21, 2010, vol. 110, No. 107, pp. 13-18.
Hiroyuki Kitagawa et al., Sensing Network, Information Processing, Information Processing Society of Japan, Sep. 15, 2010, vol. 51, No. 9, pp. 1119-1126.

\* cited by examiner

EXECUTING CONTINUOUS EVENT PROCESSING (CEP) QUERIES IN PARALLEL

BACKGROUND

The present application relates to the processing of continuous event processing (CEP) queries.

Databases have traditionally been used in applications that require storage of data and querying capability on the stored data. Existing databases are thus best equipped to run queries over finite stored data sets. However, the traditional database model is not well suited for a growing number of modern applications in which data is received as a stream of data events instead of a bounded data set. A data stream, also referred to as an event stream, is characterized by a real-time, potentially continuous, sequence of events. A data or event stream thus represents unbounded sets of data. Examples of sources that generate data streams include sensors and probes (e.g., RFID sensors, temperature sensors, etc.) configured to send a sequence of sensor readings, financial tickers, network monitoring and traffic management applications sending network status updates, click stream analysis tools, and others.

CEP is a technology useful for processing data in an event stream. CEP is highly stateful. CEP involves receiving events continuously, and finding some pattern among those events. A significant amount of state maintenance is therefore involved in CEP. Because CEP involves the maintenance of so much state, processes which apply CEP queries to data within an event stream have always been single-threaded. In computer programming, single-threading is the processing of one command at a time.

CEP query processing generally involves the continuous execution of a query relative to events that are specified within an event stream. For example, CEP query processing might be used in order to continuously observe the average price of a stock over the most recent hour. Under such circumstances, CEP query processing can be performed relative to an event stream that contained events that each indicated the current price of the stock at various times. The query can aggregate the stock prices over the last hour and then calculate the average of those stock prices. The query can output each calculated average. As the hour-long window of prices moves, the query can be executed continuously, and the query can output various different average stock prices.

Because such CEP query processing has always been performed within a single thread, the scaling of CEP query processing can become problematic. When a computing machine has multiple processors that are capable of performing operations concurrently, or when a computing system has many nodes that are capable of performing operations concurrently, the concurrent processing power of such machine and systems may be wasted when CEP query processing is performed.

Additionally, during the execution of a CEP query, sometimes errors can occur. Traditionally, when an error has occurred during the execution of a CEP query, the error has simply caused the CEP query to stop executing. The continuous query language (CQL) developed out of the structured query language (SQL). In SQL, queries typically are executed once against a set of data, rather than continuously against events in continuous event stream. Because SQL queries typically were executed just once, the failure of a SQL query was usually remedied by having a database administrator investigate the problem manually, and then having the database administrator manually make whatever changes to the database or to the query were necessary in order to solved the problem, and then having the database administrator re-executed the query. In contrast, CQL queries can be executed continuously against events in an event stream. An error that caused a CQL query to halt execution might have been due simply to a single invalid event within the event stream. Unfortunately, even if the remaining events in the event stream are valid, those events will not be processed by the CQL query as long as the CQL query remains halted. Instead, those events may simply be lost as the event stream continues to flow with time. The CQL query will not be restarted unless an administrator restarts the CQL query manually. Often, an administrator will simply restart a CQL query without changing the CQL query at all, recognizing that the error was due to an invalid event. Under such circumstances, the halting of the CQL query, with its attendant resulting loss in event data, was unfortunate and unnecessary.

BRIEF SUMMARY

Certain embodiments of the invention involve techniques for determining how and when a CEP query can be processed in a concurrent manner, such that multiple threads of execution can concurrently perform at least some of the CEP query's operations concurrently with each other. According to one technique, a user can instruct a CEP query processor to attempt to execute a CEP query in a concurrent manner. The CEP query processor responsively determines whether the CEP query's execution, or parts thereof, can be made concurrent based on certain constraints that can depend on inheritance and operation type. Based on this determination, the CEP query processor can execute at least certain parts of a CEP query in parallel relative to the same event within an event stream.

Certain embodiments of the invention involve techniques for adding the concept of faults and fault handling to the execution of CEP queries. By introducing fault handling techniques to the processing of CEP queries (CQL queries being a kind of CEP query), users are enabled to instruct a CEP query processor to respond to faults in a customized manner that does not necessarily involve the halting of the CEP query relative to which the faults occurred. For example, a fault might be due to a temporary problem. Under such circumstances, the CEP query processor can be instructed or programmed to ignore the fault and allow the execution of the CEP query to continue relative to the remainder of the event stream. Alternatively, if the fault is due to a problem with the CEP query itself, then the CEP query processor can be instructed or programmed to propagate the fault through the query processing system until the fault ultimately causes the problematic CEP query to be halted.

The foregoing, together with other features and embodiments will become more apparent when referring to the following specification, claims, and accompanying drawings.

DETAILED DESCRIPTION

Figure 1:
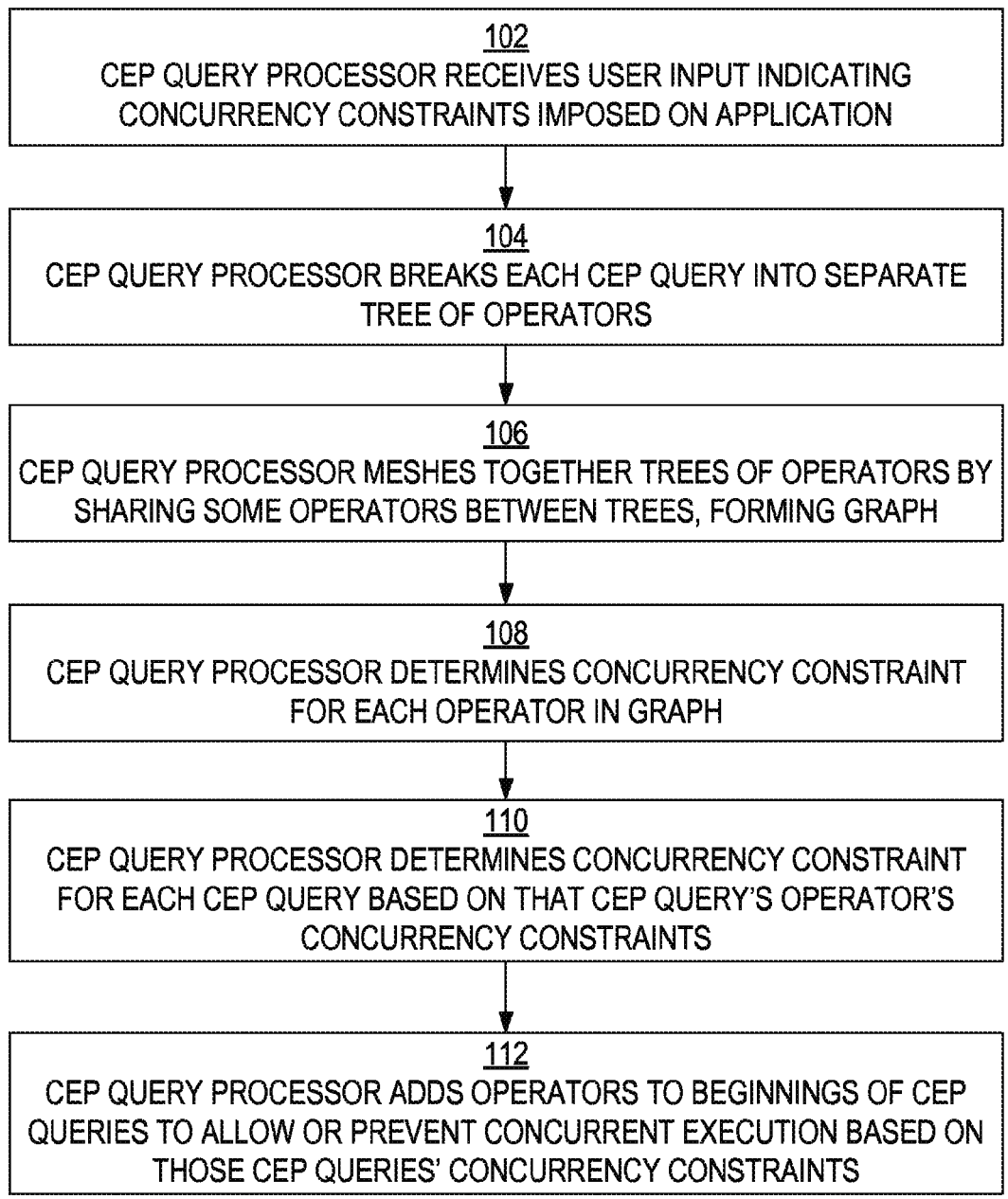
FIG. 1 is a flow diagram that illustrates an example technique for determining whether a CEP query can be executed in a concurrent manner based on the operators of that CEP query, according to an embodiment of the present invention.

In the following description, for the purposes of explanation, specific details are set forth in order to provide a thorough understanding of embodiments of the invention. However, it will be apparent that the invention may be practiced without these specific details.

In one embodiment of the invention, a CEP query processor can evaluate the various components of a CEP query. Based on this evaluation, the CEP query processor can break the CEP query into separate pieces. The CEP query processor can then evaluate each such piece of the CEP query in order to determine whether that piece can be processed in a concurrent manner. Based on the results of this evaluation, certain pieces of the CEP query can be processed in a concurrent manner—such that those pieces of the CEP query can be applied to multiple events from the event stream at the same time—while other pieces of the CEP query can be processed in a non-concurrent, sequential manner.

Events in an event stream can be ordered by time, such that a query processor can receive the oldest events in the event stream before receiving the newest events in that event stream. According to an embodiment of the invention, the CEP query processor can receive, from a user, a directive indicating that none, all, or at least part of a specified CEP query can be processed in a concurrent manner, or in other words, in parallel. For example, the user can inform the CEP query processor that the specified CEP query is completely ordered. Under such circumstances, the CEP query processor can determine that no part of the specified CEP query can be processed in a concurrent manner, because concurrent processing of a completely ordered CEP query could cause the processed events to lose their order. For another example, the user can inform the CEP query processor that the specified CEP query is unordered. A CEP query is unordered if the order in which the CEP query processes and outputs the events from an event stream does not matter to the user. For yet another example, the user can inform the CEP query processor that the specified CEP query is partition-ordered. A CEP query is partition-ordered if, for each of the CEP query's partitions, the events within that partition must be processed in order relative to each other, but not necessarily in order relative to the events within other partitions. Based on the user's directive, the CEP query processor can determine which, if any, pieces of the CEP query can be processed in a concurrent manner. Each partition involved in partition-based processing might contain events from a different category. For example, partition-based processing might involve computing a separate average stock price for each separate company having stock price events represented within the same event stream. Under such circumstances, the CEP query is conceptually partitioned by stock symbol. A CEP query may indicate that it involves partition-based processing by its inclusion of a "group by" clause.

In an embodiment, concurrent processing of a CEP query does not cause multiple events in an event stream to be processed concurrently. Instead, concurrent processing of a CEP query can cause multiple portions, or operations, of that CEP query to be performed concurrently relative to a particular event within an event stream. For each such particular event in the event stream, those multiple portions of the CEP query can be performed concurrently relative to that particular event. In an embodiment of the invention, a CEP processor can process a portion of a CEP query relative to an event in a concurrent manner by executing multiple threads, each of which can perform an operation of the CEP query relative to the event concurrently. When this happens, there is no guarantee concerning which of the multiple threads will finish performing its operations first. A single thread can be devoted to extracting events from the event stream in order to prevent the events from inadvertently becoming out-of-order.

In an embodiment, the CEP query processor can receive input from a user indicating certain constraints that are possessed by an application of that user. For example, a user might have an application that displays a stock price on a dashboard. The stock price might be read from an event stream. It might be the case that the user does not care whether the stock prices from the event stream are displayed strictly in time order. Under such circumstances, the user's application can cope with unordered events. In other cases, a user's application might require that events remain ordered. For example, an application might involve the automatic sale of a stock in response to a determination that the stock's price has declined beneath a specified threshold. Under such circumstances, it would be important for the order of the stock price events to be processed in order. The user to whom the application belongs can inform the CEP query processor about the ordering constraints, if any, that the application possesses in this regard.

In an embodiment, after receiving such constraint information from a user, the CEP query processor can determine which pieces, or operations, of a CEP query can be performed in a concurrent manner while still upholding those constraints. In an embodiment, the CEP processor can apply a particular "calculus" to make this determination. In making this determination, the CEP processor can determine a manner in which the central processing units of a machine, and/or the nodes of a system, can be used maximally to execute the CEP query while still honoring the constraints.

Potentially, multiple different CEP queries can execute relative to the same event stream. In a CEP system, multiple different CEP queries can be registered with the CEP system and then continuously executed relative to an event stream. Each such CEP query can be conceived of conceptually as a tree of operators, each having an operation type. In an embodiment of the invention, the CEP query processor can mesh together all of the CEP queries that are to be executed relative to the same event stream, conceptually by meshing together the operator trees for those CEP queries. The CEP query processor can perform this meshing by first breaking down each CEP query into the low-level operators that make up that CEP query. Breaking down the CEP queries in this manner does not necessarily incur any extra cost in the CEP query processing system, because such CEP queries often are broken down in this manner for other reasons anyway. In an embodiment of the invention, the kinds of operations into which a CEP query processor can break down a CEP query include (1) filtering operations, (2) selection operations, (3) projection operations, and (4) join operations, among potentially other kinds of operations. These are the same kinds of operations that are typically found in a query that can be performed relative to a database system. The CEP query processor can then determine, based on the operation types of these low-level operators, which of these low-level operators, potentially from separate CEP queries, can be shared.

For example, multiple CEP queries might perform a filtering operation. A filtering operation can selectively output fewer than all events received from an event stream; a filtering operation can filter out other events, which do not satisfy operation-specified filtering criteria, from the event stream so that the filtering operation does not pass those events on to other query operations. In an embodiment, if multiple CEP queries in a set of CEP queries performs filtering operations relative to an event stream, then the CEP query processor can determine that all of the filtering operations in these CEP queries can share the same filtering operator, even if the filtering criteria for these filtering operations differ. In an embodiment, certain other types of operations, such as group-by operations and aggregation operations, are not allowed to share operators, even if multiple CEP queries executing relative to an event stream perform those types of operations. Thus, according to an embodiment of the invention, only certain specified types of operations, such as filtering operations, can share operators. In an embodiment of the invention, the CEP query processor can mesh together all operators that can be shared by multiple CEP queries executing relative to the same event stream, and leave unmeshed all other operators. Thus, multiple filtering operations from multiple CEP queries can be meshed together by causing those filtering operations to share a single filtering operator, while group-by operations, aggregation operations, and other kinds of un-shareable operations can retain separate operators. In an embodiment of the invention, the CEP query processor can attempt to make as many operations as possible share the same operator, limited by the operation type considerations discussed above.

In an embodiment of the invention, the CEP query processor can link together the set of operators determined and created in this manner, potentially with some sharing, into a directed graph of operators. In the graph, the operators can be linked together based on their inputs and outputs. Operators that output events to other operators can have outgoing links to those other operators in the graph. Operators that receive events from other operators can have incoming links from those other operators in the graph. A particular operator can have multiple incoming and/or outgoing links to and from other operators in the graph. This is especially likely to occur if the particular operator is an operator that is shared by multiple separate CEP queries executing relative to the event stream. Thus, an operator from a first CEP query and an operator from a second CEP query can both output events to a particular filtering operator that is shared by the first and second CEP queries. The particular filtering operator that is so shared can output events to another operator from the first CEP query and another operator from the second CEP query.

Overall, then, the directed graph of operators can have multiple root operators (one for each CEP query), multiple intermediary operators, and multiple leaf operators. Each root operator can receive events as input directly from the event stream and output those events to other operators. The leaf operators can receive events from other operators, perform operations relative to those events, and then output those events to an application's event consumers, such as application components that display output based on those events. The CEP query processor can organize these operators within the directed graph relative to each other based on their operation types. Thus, for example, the CEP query processor can ensure that an operator that extracts events from an event stream comes before, or passes output to, a filtering operator that filters those events. Likewise, for example, the CEP query processor can ensure that such a filtering operator comes before, or passes output to, an aggregation operator that aggregates data specified by those events (e.g., calculating an average). This organization can be based on the fact that filtering should be performed prior to aggregation in order for the aggregation to be performed properly, although this may potentially vary depending upon the particular syntax of the CEP query.

In an embodiment of the invention, the CEP query processor can perform a recursive technique relative to the operators in the directed graph of operators to determine which of the operators in graph can perform its operations in parallel with other operators in that graph. More specifically, the CEP processor can perform this technique to determine the extent to which each operator in the graph can perform its operations in parallel with other operators in that graph. As is discussed above, some of the operators in the directed graph of operators are leaf operators that are the furthest away in the graph from the event stream itself (the root operators being the closest to the event stream). According to one embodiment, the CEP query processor can begin by performing the recursive technique relative to each leaf operator in the directed graph of operators. The recursive technique can involve determining the extent to which the particular operator upon which the technique is being performed can be executed concurrently with other operators. This determination, in turn, can involve first performing the same technique, recursively, on all of the other operators from which the particular operator has an incoming link in the direct graph of operators. If the operator upon which the recursive technique is being performed is a root operator, which receives events directly from the event stream, then the technique can be recursively performed relative to the event stream itself. The event stream has certain properties. These properties indicate whether the event stream is completely ordered, unordered, or partition-ordered based on some specified partitioning. In an embodiment, these properties can be specified by the user of the application that receives events from the event stream, as discussed above.

According to an embodiment of the invention, during the performance of the recursive technique relative to a particular operator in the directed graph of operators, a constraint, which indicates the extent to which that particular operator can be executed concurrently with other operators, can be determined for the particular operator in the following manner. First, an "inherited" constraint for the particular operator can be determined based on the constraints of its "parents" (the operators from which it has incoming links, or from which it receives input) in the directed graph. Then, another, type-based constraint, which is based on the particular operator's own operation type, can be determined for the particular operator. The particular operator's final constraint can be based on its inherited constraint and its type-based constraint. For example, the particular operator's final constraint can be the most constrained of its inherited and type-based constraints.

To determine the particular operator's inherited constraint, first, according to the recursive technique, the final constraints of each of the other operators from which the particular operator has incoming links in the graph can be determined. The particular operator's inherited constraint then can become the most constrained final constraint of those other operators. In an embodiment, completely ordered is the most constrained constraint. In an embodiment, partition-ordered is a constraint that is less constrained that completely ordered, but more constrained than unordered. In an embodiment, unordered is the least constrained constraint.

Thus, for example, if a particular operator has incoming links from three other operators in the directed graph of operators, and if the final constraints of these other operators are completely ordered, partition-ordered, and unordered, then the inherited constraint of the particular operator can become completely ordered (the most constrained of the constraints of the other operators from which the particular operator has incoming links), meaning that the particular operator cannot be executed concurrently with other operators at all. For another example, if a particular operator has incoming links from two other operators in the directed graph of operators, and if the final constraints of these other operators are both unordered, then the inherited constraint of the particular operator similarly can become unordered. The constraint of the event stream itself can be determined based on its properties.

After the inherited constraint for the particular operator has been determined based on the constraints of the other operators from which the particular operator has incoming links, the final constraint for the particular operator can become its inherited constraint unless the particular operator's type-based constraint is more constrained than its inherited constraint. Each operator can have an operation type, and each operation type can have a constraint that is completely ordered, partition-ordered, or unordered. For example, a filtering operation type can have an unordered constraint; the order in which filtering is performed does not matter. However, for another example, a standard deviation operation type can have a completely ordered constraint. Thus, even if the standard deviation operator's inherited constraint is unordered or partition-ordered, the standard deviation operator's final constraint can become completely ordered, because the operator's type-based constraint is more constrained than the operator's inherited constraint. Thus, in one embodiment of the invention, a particular operator's final constraint can become the most constrained of: (a) the constraints of the operators from which the particular operator has incoming links in the directed graph of operators and (b) the particular operator's own type-based constraint. If the particular operator has outgoing links to other operators in the directed graph of operators, it can be this final constraint of the particular operator that is used to determine, at least partially, the inherited constraints of those other operators.

In this recursive manner, each of the operators in the directed graph of operators can obtain a property indicating an extent to which that operator can be executed concurrently with other operators in the directed graph of operators, that property being a final constraint that can be one of: completely ordered, partition-ordered, or unordered. Ultimately, each of the root operators in the directed graph of operators can obtain such a property. Inasmuch as each such root operator can correspond to a separate CEP query, the property for that root operator can become the property for the entire corresponding CEP query.

According to an embodiment of the invention, after each of the CEP queries has obtained a constraint property in the manner discussed above, the CEP query processor can spawn multiple separate threads of execution for each such CEP query that has an unordered constraint. In creating the query execution plan for a particular CEP query, the CEP query processor can ensure that each of these threads receives, in parallel, the same event from the event stream. These threads can then process those events in parallel and output their processed events to their consumer. In one embodiment, in order to cause these threads of execution to be spawned, prior to the execution of the particular CEP query, the CEP query processor can place thread-spawning operators at the beginning of the particular CEP query to be executed at the beginning of the execution of that CEP query.

Similarly, in one embodiment of the invention, the CEP query processor can spawn multiple separate threads of execution for each CEP query that has a partition-ordered constraint. These operations performed by these threads are specially segregated based on the specified partitions, such that each thread handles the operators of a different partition corresponding only to that thread, and such that within a thread, events are processed in a sequential manner. In creating the query execution plan for a particular CEP query, the CEP query processor can ensure that each of these threads only receives events that pertain to its partition (e.g., filtering stock prices for a specified company), but that these threads can operate on different events (for different partitions) from the event stream in parallel. In one embodiment, in order to cause these threads of execution to be spawned, prior to the execution of the particular CEP query, the CEP query processor can place thread-spawning operators at the beginning of the particular CEP query to be executed at the beginning of the execution of that CEP query.

In one embodiment of the invention, for each CEP query that has a completely ordered constraint, prior to the execution of that CEP query, the CEP query processor can place locking operators at the beginning of that CEP query to be executed at the beginning of the execution of that CEP query in order to ensure that the operations of each operator involved in that CEP query are performed sequentially, within a single thread, rather than in parallel.

FIG. 1 is a flow diagram that illustrates an example technique 100 for determining whether a CEP query can be executed in a concurrent manner based on the operators of that CEP query, according to an embodiment of the present invention. Although certain blocks are illustrated by way of example in FIG. 1, alternative embodiments of the invention may involve more, fewer, or different blocks, and/or blocks occurring in a different order. In block 102, a CEP query processor can receive, from a user, input indicating concurrency constraints that are to be imposed on an application that involves a group of CEP queries. In block 104, the CEP query processor can break each CEP query in the group into a separate tree of operators. In block 106, the CEP query processor can mesh together the trees of operators by sharing some operators between trees, thereby forming a directed graph of operators. In block 108, the CEP query processor can determine a concurrency constraint for each operator in the directed graph. In block 110, the CEP query processor can determine a concurrency constraint for each CEP query in the group based on the concurrency constraints for the operators of that CEP query. In block 112, the CEP query processor can add operators to the beginnings of the CEP queries to allow or prevent concurrent execution of those CEP queries based on the concurrency constraints for those CEP queries.

Figure 2:
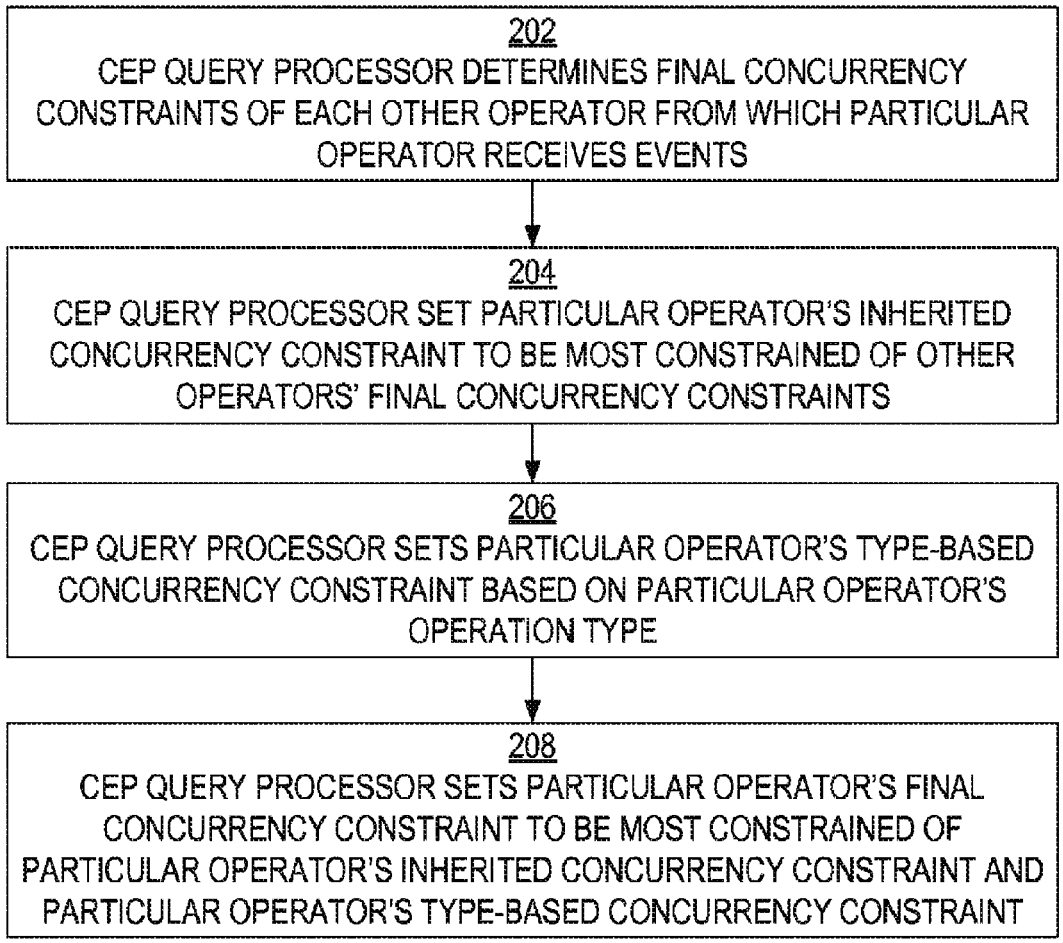
FIG. 2 is a flow diagram that illustrates an example technique for determining a concurrency constraint for a particular operator in a directed graph of operators, according to an embodiment of the present invention.

FIG. 2 is a flow diagram that illustrates an example technique 200 for determining a concurrency constraint for a particular operator in a directed graph of operators, according to an embodiment of the present invention. Technique 200 can be performed relative to each of the operators in a directed graph of operators after the meshing of block 106 of FIG. 1 has been performed, for example. Although certain blocks are illustrated by way of example in FIG. 2, alternative embodiments of the invention may involve more, fewer, or different blocks, and/or blocks occurring in a different order. In block 202, the CEP query processor can determine final concurrency constraints of each other operator from which the particular operator receives events. For example, the CEP query processor can use technique 200 recursively to determine the final concurrency constraints for each such other operator. In block 204, the CEP query processor can set the particular operator's inherited concurrency constraint to be the most constrained of the final concurrency constraints of the other operators from which the particular operator receives events. In block 206, the CEP query processor can set the particular operator's type-based concurrency constraint based on a type of operation performed by the operator. In block 208, the CEP query processor can set the particular operator's final concurrency constraint to be the most constrained of (a) the particular operator's inherited concurrency constraint and (b) the particular operator's type-based concurrency constraint.

Figure 3:
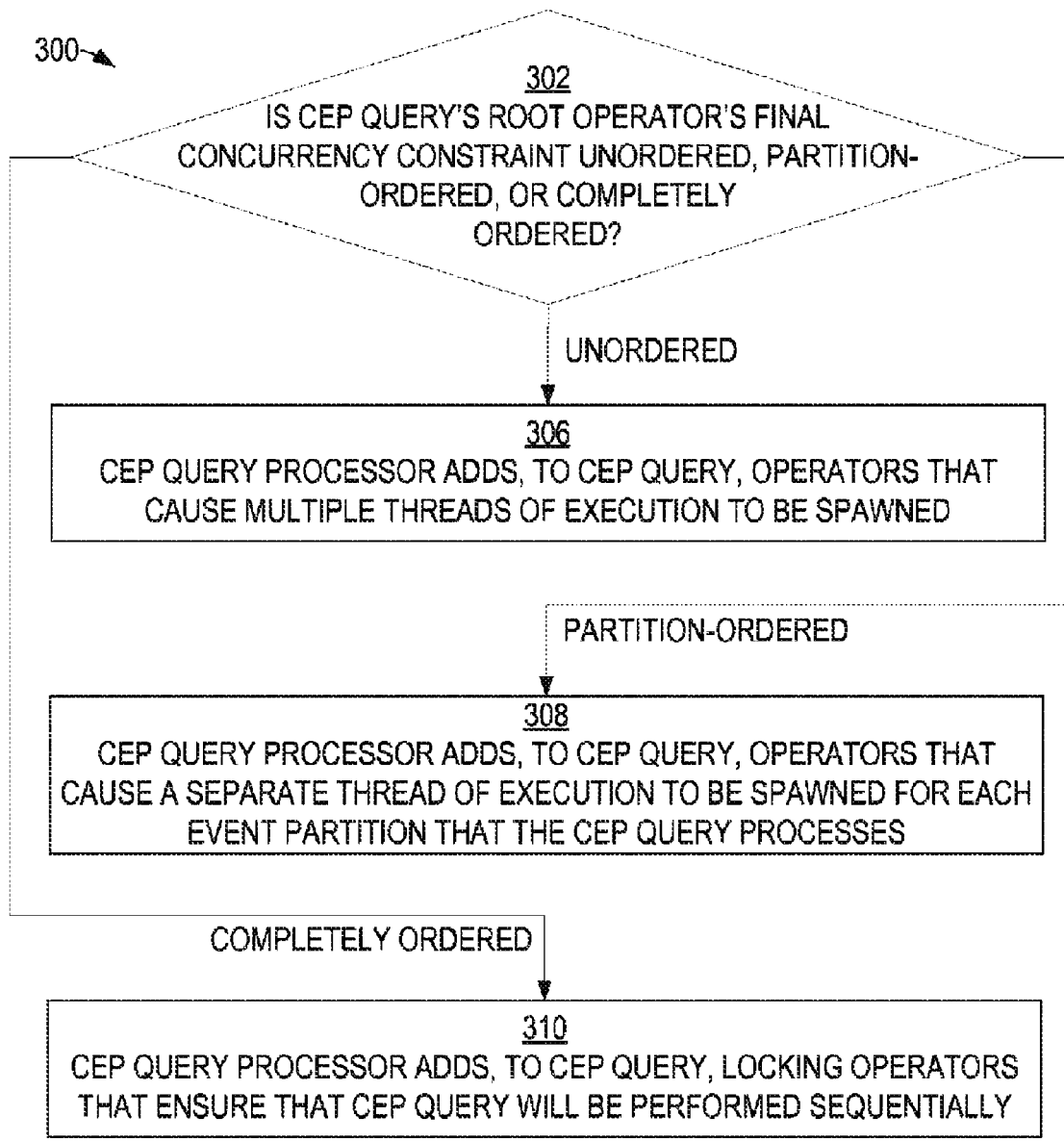
FIG. 3 is a flow diagram that illustrates an example technique for adding operators to the beginning of a CEP query in order to allow or enforce maximum permissible concurrency in the execution of that CEP query, according to an embodiment of the present invention.

FIG. 3 is a flow diagram that illustrates an example technique 300 for adding operators to the beginning of a CEP query in order to allow or enforce maximum permissible concurrency in the execution of that CEP query, according to an embodiment of the present invention. Technique 300 can be performed relative to each of the CEP queries in a group of CEP queries involved in an application after the application of technique 200 of FIG. 2 has been performed relative to all of the operators in the directed graph of operators, for example. Although certain blocks are illustrated by way of example in FIG. 3, alternative embodiments of the invention may involve more, fewer, or different blocks, and/or blocks occurring in a different order. In block 302, the CEP query processor can determine whether the final concurrency constraint of the CEP query's root operator in the directed graph of operators is unordered, partition-ordered, or completely ordered. If the final concurrency constraint is unordered, then control passes to block 306. If the final concurrency constraint is partition-ordered, then control passes to block 308. If the final concurrency constraint is completely ordered, then control passes to block 310.

In block 306, the CEP query processor can add, to the beginning of the CEP query, operators that cause multiple threads of execution to be spawned to permit execution of the CEP query in a concurrent manner. Alternatively, in block 308, the CEP query processor can add, to the beginning of the CEP query, operators that cause a separate thread of execution to be spawned for each of the event partitions that the CEP query processes. Alternatively, in block 310, the CEP query processor can add, to the beginning of the CEP query, locking operators that ensure that the operation of the CEP query will be performed sequentially rather than in parallel.

According to an embodiment of the invention, the CEP query processor can be modified to introduce fault-handling mechanisms into the CEP query processor. In one embodiment, these mechanisms involve an analysis of the directed graph of operators discussed above. The analysis can involve a determination of whether a particular operator in the directed graph is shared by multiple executing CEP queries or not.

In an embodiment of the invention, during the execution of multiple CEP queries relative to an event stream, the CEP query processor can detect the occurrence of a fault. This fault can be raised by one of the operators within the directed graph of operators discussed above. For example, a particular operator can raise a fault in response to determining that the event upon which that particular operator is attempting to perform its operation specifies invalid data. In response to detecting the occurrence of a fault, the CEP query processor can determine which one of the operators in the directed graph of operators raised the fault. The operator that raised the fault might be a filtering operator that performs filtering operations relative to events in the event stream, or the operator that raised the fault might be some other more complex type of operator, such as a join operator that performs join operations.

In an embodiment of the invention, the CEP query processor can include a registration facility through which a user of the CEP query processor can register a customized fault handler of the user's own specification. This fault handler can pertain in scope to all of the CEP queries that the CEP query processor executes, such that faults raised by the operator of any CEP query being executed by the CEP query processor can be handled by that fault handler. Multiple separate and different fault handlers can be registered with the same CEP query processor, in which case all of them can handle faults raised by any of the CEP query processor's executing CEP queries.

According to an embodiment of the invention, in response to any operator of any executing CEP query raising a fault, the fault handlers registered to the CEP query processors can be responsively invoked in the order of the registration of those fault handlers. The CEP query processor can provide some contextual information pertaining to the fault to each such fault handler. This contextual information can include an identity of the fault itself as well as an identity of the operator (from the directed graph of operators) that raised the fault. As each fault handler is invoked, that fault handler can determine, based on its internal instructions, whether to catch the fault or re-throw the fault. Some registered fault handlers can be customized to catch types of faults that other registered fault handlers have not been customized to catch. For example, a particular fault handler might be customized to catch faults raised by filtering operators but not faults raised by join operators. For another example, a particular fault handler might be customized to catch faults resulting from timestamp errors in event data but not faults resulting from other kinds of errors in event data.

In an embodiment of the invention, if a fault handler decides to catch the fault, then the fault handler can handle the fault in a manner that is based on its internal instructions pertaining to faults of the fault's type. These internal instructions can be customized by the fault handler's creator. Under such circumstances, the fault thereafter can be treated as though the fault had not occurred; the fault's existence can be removed from the system. The CEP query processor can continue to execute the CEP queries, permitting the CEP queries to process additional events from the event stream, without halting any CEP query. In an embodiment of the invention, any other registered fault handlers subsequently invoked responsive to the same fault detect no fault that they can catch.

Alternatively, in an embodiment of the invention, if a particular fault handler decides to re-throw the fault, meaning that the particular fault handler has decided not to handle the fault (potentially because the particular fault handler contains no instructions for handling faults of the fault's specific type), then the CEP query processor can invoke the next registered fault handler, if any, in order of registration. That next fault handler can then similarly decide whether to catch the fault or re-throw the fault, again based on its own internal instructions. This approach can continue repetitively, with the CEP query processor invoking subsequent registered fault handlers in the order of their registration, either until one of the registered fault handlers catches and handles the fault, thereby removing the fault's existence from the system, or until there are no further user-registered fault handlers for the CEP query processor to invoke.

According to an embodiment of the invention, the CEP query processor can include a default fault handler in addition to any user-registered, user-customized fault handlers. If a fault is not caught by any of the user-registered fault handlers, then the default fault handler can catch the fault. In an embodiment of the invention, the default fault handler does not re-throw any fault, but instead catches every fault that has been re-thrown by all of the user-registered fault handlers. In response to catching a fault, the default fault handler can halt execution of each CEP query that included the operator that raised the fault. Inasmuch as some operators can be shared by multiple CEP queries, the default fault handler can, under some circumstances, halt execution of multiple CEP queries in response to catching a single fault that was raised by an operator shared by all of those CEP queries.

As is discussed above, in one embodiment of the invention, the CEP query processor's default fault handler can halt execution of a CEP query in response to catching a fault. However, in an alternative embodiment of the invention, instead of halting execution of the CEP query in response to catching a fault, the default fault handler can throw the fault as a JAVA exception which can be caught by a fault handler of a JAVA adapter that is feeding the event stream's events to the CEP query processor. Thus, under such circumstances, the JAVA adapter that is the event stream source or producer can receive the fault as a JAVA exception from the CEP query processor's default fault handler. The manner in which the JAVA adapter handles the exception can vary based on the JAVA adapter's internal instructions and programming. For example, if the JAVA adapter is a JAVA messaging system (JMS) adapter, then the JAVA adapter can determine whether the event is invalid, and, in response to determining that the event is invalid, the JAVA adapter can ask the messaging system from whence the JAVA adapter obtained the event to re-send a valid version of the event to the JAVA adapter. Alternatively, the JAVA adapter can roll-back the event, and/or ignore the event and allow other events in the event stream to proceed to the CEP query processor.

Potentially, a single event can cause multiple separate operators in the directed graph of operators to raise faults in response to that event. For example, a filtering operator that outputs events to a join operator, and the join operator itself, both might raise a fault in response to a particular event. This occurrence may be especially likely under circumstances in which the CEP query processor is processing events in a concurrent manner. In one embodiment of the invention, when multiple faults are raised in response to the same event, the CEP query processor can group the faults together for handling in a unified manner. The CEP query processor can accomplish this grouping by creating a "parent" fault called "event processing fault." This parent fault can specifies, as context within the parent fault, both an identity of the event that caused the faults to be raised, as well as an identity of each operator that raised a fault in response to the event. In an embodiment, the fact that multiple faults have been raised in response to the same event can be detected by a "parent" operator that receives events as input from the fault-raising operators, and the grouping can be performed at this parent operator. The parent fault can then caught or re-thrown by fault handlers in the manner discussed above, while the other faults that were grouped together within the parent fault can be removed from the system so as not to be separately caught by any fault handler. As a consequence of the grouping, the fault handlers can avoid unnecessary repetitious fault handling for faults arising from the same event. In one embodiment of the invention, fault handlers can be customized to handle these "compound" grouped faults in a manner that is different from the manner in which those faults handler handle "simple" faults.

Figure 4:
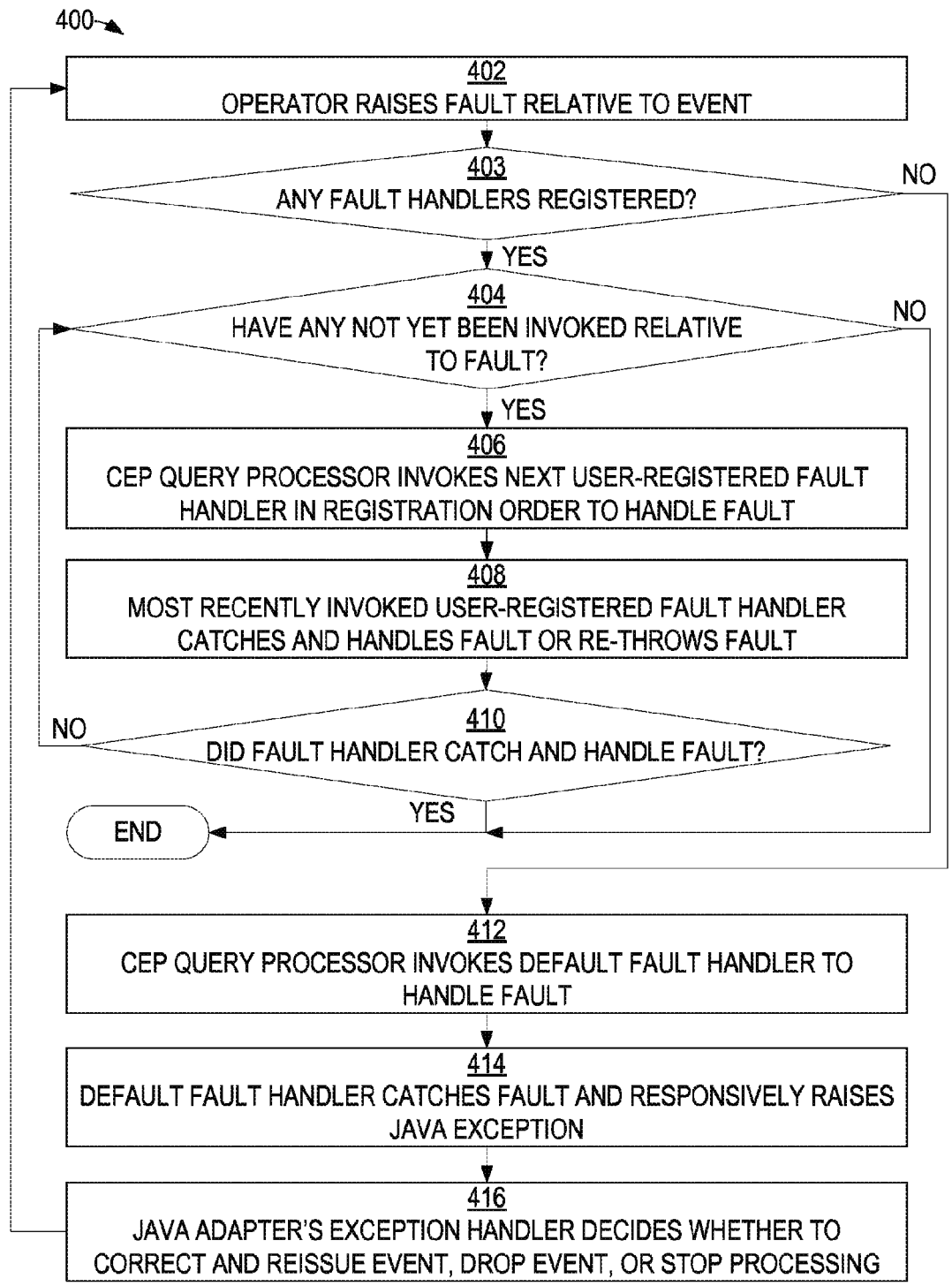
FIG. 4 is a flow diagram that illustrates an example technique whereby user-registered fault handlers of a CEP query processor can handle faults thrown by operators of CEP queries, according to an embodiment of the present invention.

FIG. 4 is a flow diagram that illustrates an example technique 400 whereby user-registered fault handlers of a CEP query processor can handle faults thrown by operators of CEP queries, according to an embodiment of the present invention. Although certain blocks are illustrated by way of example in FIG. 4, alternative embodiments of the invention may involve more, fewer, or different blocks, and/or blocks occurring in a different order. In block 402, an operator within a directed graph of operators representing concurrently executing CEP queries can raise a fault relative to an event being processed by that operator. In block 403, in response to detecting that the fault was raised, the CEP query processor can determine whether any user fault handlers are registered by users to handle the fault. If so, then control passes to block 404. If not, control passes to block 412. In block 404, the CEP query processor determines whether any of the user-registered faults handlers have not yet been invoked relative to the fault. If at least one user-registered fault handler has not yet been invoked relative to the fault, then control passes to block 406. Otherwise, technique 400 ends.

In block 406, the CEP query processor can invoke the next user-registered fault handler, in registration order, to handle the fault. In block 408, the most recently invoked user-registered fault handler can either catch and handle the fault or re-throw the fault. In block 410, a determination can be made as to whether the most recently invoked user-registered fault handler caught or re-threw the fault. If the fault was caught, then technique 400 is finished. Alternatively, if the fault was re-thrown, then control passes back to block 404.

Alternatively, in block 412, the CEP query processor can invoke a default fault handler (not user-registered) to handle the fault. In block 414, the default fault handler can catch the fault and responsively raise a JAVA exception. In block 416, an exception handler of a JAVA adapter, which is the source of the event stream that contained the event that caused the fault to be raised in block 402, catches the JAVA exception and causes a corrected version of the event to be re-issued to the CEP query processor. Control then passes back to block 402, in which another fault potentially pertaining to another event can be raised potentially by another operator.

Figure 5:
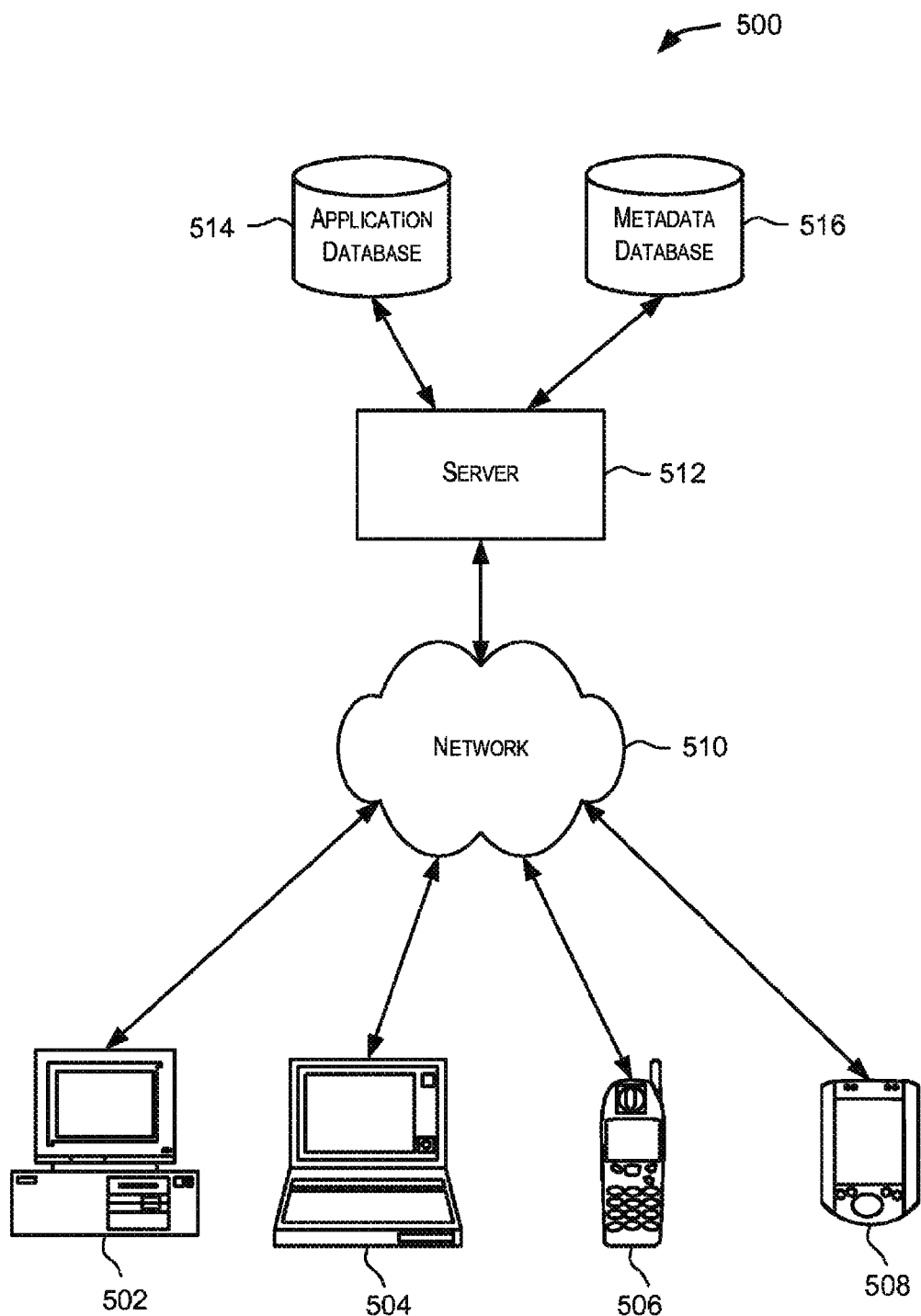
FIG. 5 is a simplified block diagram illustrating components of a system environment that may be used in accordance with an embodiment of the present invention.

FIG. 5 is a simplified block diagram illustrating components of a system environment 500 that may be used in accordance with an embodiment of the present invention. As shown, system environment 500 includes one or more client computing devices 502, 504, 506, 508, which are configured to operate a client application such as a web browser, proprietary client (e.g., Oracle Forms), or the like. In various embodiments, client computing devices 502, 504, 506, and 508 may interact with a server 512.

Client computing devices 502, 504, 506, 508 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 502, 504, 506, and 508 may be any other electronic device, such as a thin-client computer, Internet-enabled gaming system, and/or personal messaging device, capable of communicating over a network (e.g., network 510 described below). Although exemplary system environment 500 is shown with four client computing devices, any number of client computing devices may be supported. Other devices such as devices with sensors, etc. may interact with server 512.

System environment 500 may include a network 510. Network 510 may be any type of network familiar to those skilled in the art that can support data communications using any of a variety of commercially-available protocols, including without limitation TCP/IP, SNA, IPX, AppleTalk, and the like. Merely by way of example, network 510 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 500 also includes one or more server computers 512 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 512 may be adapted to run one or more services or software applications described in the foregoing disclosure. For example, server 512 may correspond to a continuous event processing server.

Server 512 may run an operating system including any of those discussed above, as well as any commercially available server operating system. Server 512 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 500 may also include one or more databases 514, 516. Databases 514, 516 may reside in a variety of locations. By way of example, one or more of databases 514, 516 may reside on a storage medium local to (and/or resident in) server 512. Alternatively, databases 514, 516 may be remote from server 512, and in communication with server 512 via a network-based or dedicated connection. In one set of embodiments, databases 514, 516 may reside in a storage-area network (SAN) familiar to those skilled in the art. Similarly, any necessary files for performing the functions attributed to server 512 may be stored locally on server 512 and/or remotely, as appropriate. In one set of embodiments, databases 514, 516 may include relational databases, such as Oracle 10g, that are adapted to store, update, and retrieve data in response to SQL-formatted commands.

Figure 6:
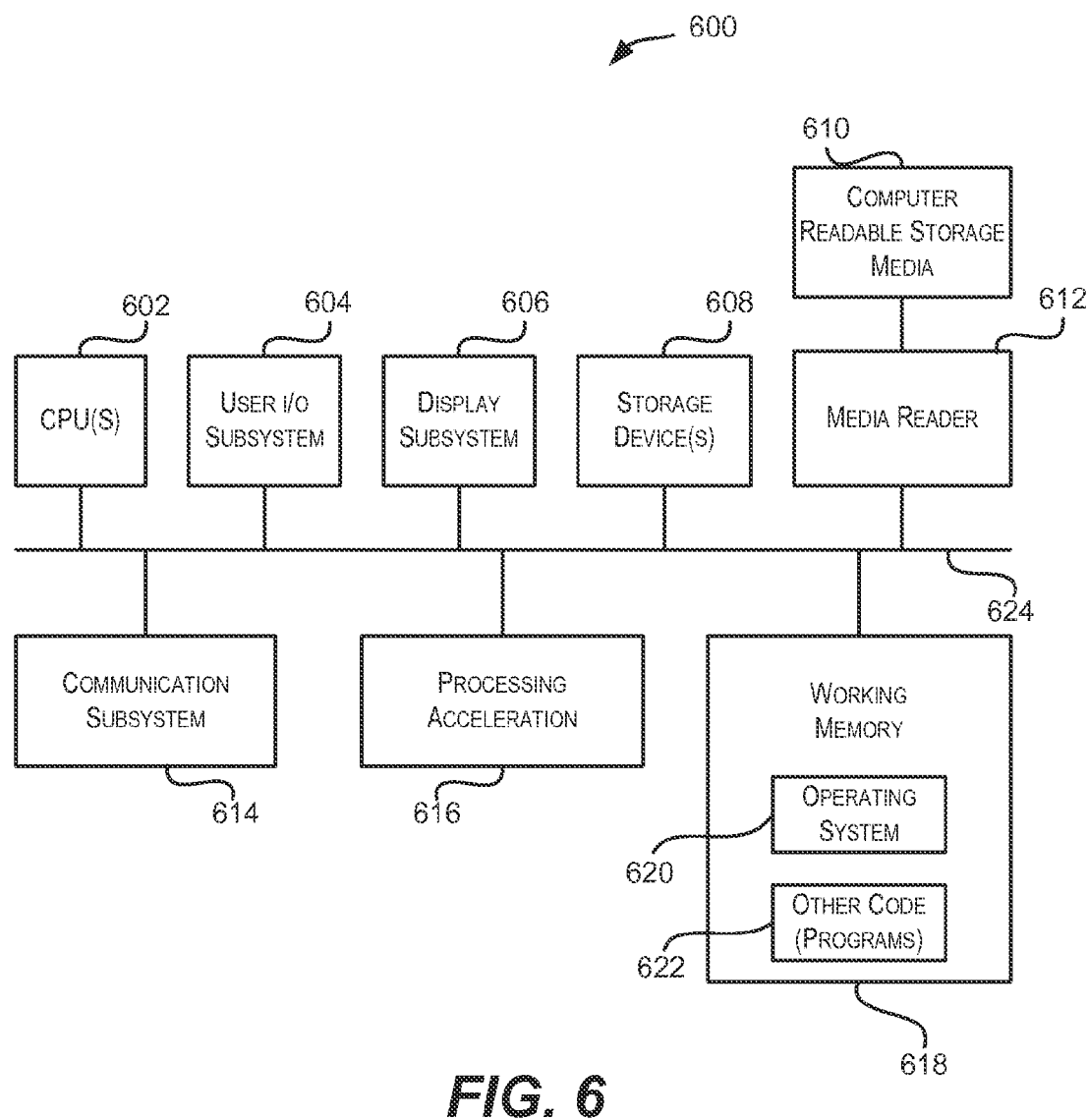
FIG. 6 is a simplified block diagram of a computer system that may be used in accordance with embodiments of the present invention.

FIG. 6 is a simplified block diagram of a computer system 600 that may be used in accordance with embodiments of the present invention. For example, a continuous even processing server may be implemented using a system such as system 600. Computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). Computer system 600 may also include one or more storage devices 608. By way of example, the storage device(s) 608 may include devices such as disk drives, optical storage devices, and solid-state storage devices such as a random access memory (RAM) and/or a read-only memory (ROM), which can be programmable, flash-updateable and/or the like.

Computer system 600 may additionally include a computer-readable storage media reader 612, a communications subsystem 614 (e.g., a modem, a network card (wireless or wired), an infra-red communication device, etc.), and working memory 618, which may include RAM and ROM devices as described above. In some embodiments, computer system 600 may also include a processing acceleration unit 616, which can include a digital signal processor (DSP), a special-purpose processor, and/or the like.

Computer-readable storage media reader 612 can further be connected to a computer-readable storage medium 610, together (and, optionally, in combination with storage device (s) 608) comprehensively representing remote, local, fixed, and/or removable storage devices plus storage media for temporarily and/or more permanently containing computer-readable information. Communications system 614 may permit data to be exchanged with network 1610 and/or any other computer described above with respect to system environment 1600.

Computer system 600 may also comprise software elements, shown as being currently located within working memory 618, including an operating system 620 and/or other code 622, such as an application program (which may be a client application, Web browser, mid-tier application, RDBMS, etc.). In an exemplary embodiment, working memory 618 may include executable code and associated data structures (such as caches) used for the techniques described above. It should be appreciated that alternative embodiments of computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. U.S. Patent Applications having the following serial numbers are incorporated by reference herein: Ser. Nos. 12/548,187; 12/396,008; 12/396,464; 12/395,871; 12/506,891; 12/548,209; 12/506,905; 12/534,384; 12/548,222; 12/534,398; 12/548,281; and 12/548,290.

What is claimed is:

1. A computer-readable memory storing a plurality of instructions for causing a processor to perform operations, the plurality of instructions comprising:
    instructions that cause the processor to determine that multiple portions of a continuous event processing (CEP) query can be executed concurrently relative to an event in an event stream, the instructions that cause the processor to determine that multiple portions of a continuous event processing (CEP) query can be executed concurrently relative to an event in an event stream comprising:
        instructions that cause the processor to split the CEP query into a plurality of separate operators;
        instructions that cause the processor to determine a separate ordering constraint for each particular operator within the plurality of separate operators;
        instructions that cause the processor to determine an ordering constraint for the CEP query based at least in part on the ordering constraints that the processor determined for the plurality of separate operators; and
        instructions that cause the processor to determine, based on the ordering constraint for the CEP query, whether the multiple portions of the CEP query can be executed in a concurrent manner; and
    instructions that cause the processor to execute the multiple portions of the CEP query concurrently against a first event received via the event stream, the instructions that cause the processor to execute the multiple portions of the CEP query concurrently against a first event received via the event stream comprising:
        instructions that cause the processor to spawn multiple threads of execution that concurrently process the multiple portions of the CEP query against the first event received via the event stream in response to determining that the multiple portions of the CEP query can be executed in a concurrent manner.

2. The computer-readable memory of claim 1, wherein the instructions that cause the processor to determine the ordering constraint for the CEP query cause the processor to determine the ordering constraint for the CEP query based at least in part on an ordering constraint that is associated with the event stream.

3. The computer-readable memory of claim 1, wherein the instructions that cause the processor to determine the separate ordering constraint for each particular operator within the plurality of separate operators comprise instructions that cause the processor to determine, for at least one operator of the plurality of separate operators, the ordering constraint for the particular operator based at least in part on one or more constraints of one or more other operators from which the particular operator receives input.

4. The computer-readable memory of claim 1, wherein the instructions that cause the processor to determine the separate ordering constraint for each particular operator within the plurality of separate operators comprise instructions that cause the processor to determine, for a particular operator of the plurality of separate operators, the ordering constraint for the particular operator based at least in part on whether an operation type of the particular operator is a filtering operation type.

5. The computer-readable memory of claim 1, wherein the instructions that cause the processor to determine the separate ordering constraint for each particular operator within the plurality of separate operators comprise instructions that cause the processor to determine, for a particular operator of the plurality of separate operators, the ordering constraint for the particular operator by determining a most constrained constraint within a set of constraints including (a) constraints of all other operators from which the particular operator receives input and (b) a constraint associated with an operation type of the particular operator.

6. The computer-readable memory of claim 1, wherein the plurality of instructions further comprise:
    instructions that cause the processor to merge, into a single shared operator, (a) a first operator that is used by a first CEP query that processes events in the event stream, and (b) a second operator that is used by a second CEP query that also processes events in the event stream, in response to determining that the first operator and the second operator both perform a particular type of operation.

7. The computer-readable memory of claim 1, wherein the plurality of instructions further comprise:
    instructions that cause the processor to merge, into a single shared operator, (a) a first operator that is used by a first CEP query that processes events in the event stream, and (b) a second operator that is used by a second CEP query that also processes events in the event stream, in response to determining that the first operator and the second operator both perform a particular type of operation;
    wherein the instructions that cause the processor to determine the separate ordering constraint for each particular operator within the plurality of separate operators comprise instructions that cause the processor to determine the ordering constraint for a third operator, which receives input from the shared operator, based at least in part on the ordering constraint of the shared operator;
    wherein the instructions that cause the processor to determine the separate ordering constraint for each particular operator within the plurality of separate operators comprise instructions that cause the processor to determine the ordering constraint for a fourth operator, which receives input from the shared operator, based at least in part on the ordering constraint of the shared operator;
    wherein the third operator is used by the first CEP query and is not used by the second CEP query;
    wherein the fourth operator is used by the second CEP query and is not used by the first CEP query.

8. A system for processing a data stream of events, the system comprising:
    a memory storing a plurality of instructions; and
    a processor coupled to the memory, the processor configured to execute the plurality of instructions to:
        determine that multiple portions of a continuous event processing (CEP) query can be executed concurrently relative to an event in an event stream, the instructions to determine that multiple portions of a continuous event processing (CEP) query can be executed concurrently relative to an event in an event stream comprising instructions to:
   split the CEP query into a plurality of separate operators;
   determine a separate ordering constraint for each particular operator within the plurality of separate operators;
   determine an ordering constraint for the CEP query based at least in part on the ordering constraints that the processor determined for the plurality of separate operators; and
   determine, based on the ordering constraint for the CEP query, whether the multiple portions of the CEP query can be executed in a concurrent manner; and
execute the multiple portions of the CEP query concurrently against a first event received via the event stream, the instructions to execute the multiple portions of the CEP query concurrently against a first event received via the event stream comprising instructions to:
   spawn multiple threads of execution that concurrently process the multiple portions of the CEP query against the first event received via the event stream in response to determining that the multiple portions of the CEP query can be executed in a concurrent manner.

9. The system of claim 8, wherein the processor is configured to determine the ordering constraint for the CEP query further based at least in part on an ordering constraint that is associated with the event stream.

10. The system of claim 8, wherein the processor is configured to determine the separate ordering constraint for each particular operator within the plurality of separate operators at least in part by determining, for a particular operator of the plurality of separate operators, the ordering constraint for the particular operator based at least in part on one or more ordering constraints of one or more other operators from which the particular operator receives input.

11. The system of claim 8, wherein the processor is configured to determine the separate ordering constraint for each particular operator within the plurality of separate operators at least in part by determining, for a particular operator of the plurality of separate operators, the ordering constraint for the particular operator based at least in part on whether an operation type of the particular operator is a filtering operation type.

12. The system of claim 8, wherein the processor is configured to determine the separate ordering constraint for each particular operator within the plurality of separate operators at least in part by determining, for a particular operator of the plurality of separate operators, the ordering constraint for the particular operator by determining a most constrained ordering constraint within a set of ordering constraints including (a) ordering constraints of all other operators from which the particular operator receives input and (b) an ordering constraint associated with an operation type of the particular operator.

13. The system of claim 8, wherein the processor is configured to merge, into a single shared operator, (a) a first operator that is used by a first CEP query that processes events in the event stream, and (b) a second operator that is used by a second CEP query that also processes events in the event stream, in response to determining that the first operator and the second operator both perform a particular type of operation.

14. The system of claim 8, wherein the processor is configured to merge, into a single shared operator, (a) a first operator that is used by a first CEP query that processes events in the event stream, and (b) a second operator that is used by a second CEP query that also processes events in the event stream, in response to determining that the first operator and the second operator both perform a particular type of operation; wherein the processor is configured to determine the ordering constraint for a third operator, which receives input from the shared operator, based at least in part on the ordering constraint of the shared operator; wherein the processor is configured to determine the ordering constraint for a fourth operator, which receives input from the shared operator, based at least in part on the ordering constraint of the shared operator; wherein the third operator is used by the first CEP query and is not used by the second CEP query; wherein the fourth operator is used by the second CEP query and is not used by the first CEP query.

15. A method for processing a data stream of events, the method comprising:
   determining that multiple portions of a continuous event processing (CEP) query can be executed concurrently relative to an event in an event stream, the determining comprising:
      splitting the CEP query into a plurality of separate operators;
      determining a separate ordering constraint for each particular operator within the plurality of separate operators;
      determining an ordering constraint for the CEP query based at least in part on the ordering constraints that the processor determined for the plurality of separate operators; and
      determining, based on the ordering constraint for the CEP query, whether the multiple portions of the CEP query can be executed in a concurrent manner; and
   executing the multiple portions of the CEP query concurrently against a first event received via the event stream, the executing comprising:
      spawning multiple threads of execution that concurrently process the multiple portions of the CEP query against the first event received via the event stream in response to determining that the multiple portions of the CEP query can be executed in a concurrent manner.

16. The method of claim 15, wherein determining the ordering constraint for the CEP query is further based at least in part on an ordering constraint that is associated with the event stream.

17. The method of claim 15, wherein determining the separate ordering constraint for each particular operator within the plurality of separate operators comprises determining, for a particular operator of the plurality of separate operators, the ordering constraint for the particular operator based at least in part on one or more ordering constraints of one or more other operators from which the particular operator receives input.

18. The method of claim 15, wherein determining the separate ordering constraint for each particular operator within the plurality of separate operators comprises determining, for a particular operator of the plurality of separate operators, the ordering constraint for the particular operator based at least in part on whether an operation type of the particular operator is a filtering operation type.

19. The method of claim 15, further comprising:
   merging, into a single shared operator, (a) a first operator that is used by a first CEP query that processes events in the event stream, and (b) a second operator that is used by a second CEP query that also processes events in the event stream, in response to determining that the first operator and the second operator both perform a particular type of operation.

20. The method of claim 15, further comprising:
merging, into a single shared operator, (a) a first operator that is used by a first CEP query that processes events in the event stream, and (b) a second operator that is used by a second CEP query that also processes events in the event stream, in response to determining that the first operator and the second operator both perform a particular type of operation;
wherein determining the separate ordering constraint for each particular operator within the plurality of separate operators comprises determining the ordering constraint for a third operator, which receives input from the shared operator, based at least in part on the ordering constraint of the shared operator;
wherein determining the separate ordering constraint for each particular operator within the plurality of separate operators comprises determining the ordering constraint for a fourth operator, which receives input from the shared operator, based at least in part on the ordering constraint of the shared operator;
wherein the third operator is used by the first CEP query and is not used by the second CEP query;
wherein the fourth operator is used by the second CEP query and is not used by the first CEP query.

\* \* \* \* \*